United States Patent
Yoshida et al.

(10) Patent No.: US 11,059,426 B2
(45) Date of Patent: Jul. 13, 2021

(54) DOUBLE OPENING CONSOLE BOX

(71) Applicant: TOYODA GOSEI CO., LTD., Kiyosu (JP)

(72) Inventors: Kohei Yoshida, Kiyosu (JP); Yasufumi Ike, Nagoya (JP); Keigo Hyozawa, Nagoya (JP); Kunio Yamazaki, Kiyosu (JP); Daiki Yamada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 125 days.

(21) Appl. No.: 16/599,615

(22) Filed: Oct. 11, 2019

(65) Prior Publication Data

US 2020/0156552 A1    May 21, 2020

(30) Foreign Application Priority Data

Nov. 20, 2018    (JP) ............................. JP2018-217775

(51) Int. Cl.
  *B60R 7/04*    (2006.01)
  *B60N 2/75*    (2018.01)
(52) U.S. Cl.
  CPC ............... *B60R 7/04* (2013.01); *B60N 2/793* (2018.02)

(58) Field of Classification Search
  CPC .................................. B60R 7/04; B60N 2/793
  See application file for complete search history.

(56) References Cited

FOREIGN PATENT DOCUMENTS

JP    2016-112979 A    6/2016

*Primary Examiner* — D Glenn Dayoan
*Assistant Examiner* — E Turner Hicks
(74) *Attorney, Agent, or Firm* — Posz Law Group, PLC

(57) ABSTRACT

An opening/closing mechanism of a double opening console box includes right and left operation portions for opening a lid around a left or right rotation shaft, and an erroneous operation preventing device for preventing simultaneous right and left opening actions of the lid. The erroneous operation preventing device includes a center projecting portion provided to the lid, an erroneous operation prevention bar movable leftward/rightward relative to the lid, a centering component having a left-right-symmetric recess groove at a front end, and a spring member energizing the centering component in the front-rear direction relative to the erroneous operation prevention bar so that the center projecting portion is located at the rear end bottom of the recess groove. The erroneous operation prevention bar includes a centering accommodating portion storing the centering component such that frontward/rearward movement thereof relative to the erroneous operation prevention bar is allowed and leftward/rightward movement is prohibited.

6 Claims, 15 Drawing Sheets

DOUBLE OPENING CONSOLE BOX

TECHNICAL FIELD

The present invention relates to a double opening console box including a box body, a lid for closing an opening of the box body, and an opening/closing mechanism that causes the lid to open/close around each of two left and right rotation shafts.

BACKGROUND ART

Conventionally, a double opening console box provided in a compartment of a vehicle has been known (for example, JP2016-112979A). The double opening console box includes a box body, a lid, and an opening/closing mechanism. The box body has a substantially rectangular parallelepiped storage portion having an opening at an upper surface. The lid is a member formed in a thin rectangular shape so as to correspond to the opening of the box body, and covers the opening in an openable and closable manner. The opening/closing mechanism is a mechanism that causes the lid to open/close around one rotation shaft selected from a left rotation shaft extending in the front-rear direction along a left peripheral edge of the opening of the box body, and a right rotation shaft extending in the front-rear direction along a right peripheral edge of the opening.

The opening/closing mechanism has a right operation portion, a left operation portion, a right front rod, a right rear rod, a left front rod, a left rear rod, a right front engagement hole, a right rear engagement hole, a left front engagement hole, and a left rear engagement hole. The right operation portion is attached to a body portion of the lid so as to allow an opening operation, and causes the lid to open around the left rotation shaft by the opening operation. The left operation portion is attached to the body portion of the lid so as to allow an opening operation, and causes the lid to open around the right rotation shaft by the opening operation. The right front rod is provided at a right front part of the lid so as to be movable in the front-rear direction. The right rear rod is provided at a right rear part of the lid so as to be movable in the front-rear direction. The left front rod is provided at a left front part of the lid so as to be movable in the front-rear direction. The left rear rod is provided at a left rear part of the lid so as to be movable in the front-rear direction. The right front engagement hole is provided at a right front part of the box body, and is engageable and disengageable with and from the right front rod. The right rear engagement hole is provided at a right rear part of the box body, and is engageable and disengageable with and from the right rear rod. The left front engagement hole is provided at a left front part of the box body, and is engageable and disengageable with and from the left front rod. The left rear engagement hole is provided at a left rear part of the box body, and is engageable and disengageable with and from the left rear rod.

In the above opening/closing mechanism, when the lid is in a closed state, the right front rod is engaged with the right front engagement hole, the right rear rod is engaged with the right rear engagement hole, the left front rod is engaged with the left front engagement hole, and the left rear rod is engaged with the left rear engagement hole. In this closed state, for example, when an opening operation is performed on the right operation portion, the right front rod and the right rear rod are each moved in the front-rear direction relative to the body portion of the lid, so as to be removed from the right front engagement hole and the right rear engagement hole. In this case, engagements between the rods and the engagement holes at the front and the rear on the right side are released, whereby the lid opens around the left rotation shaft so as to come into a right opened state.

Further, the opening/closing mechanism has an erroneous operation preventing device for preventing an opening action of the lid by an opening operation on the right operation portion and an opening action of the lid by an opening operation on the left operation portion from being performed simultaneously. The erroneous operation preventing device has an interposed member, a position adjustment member, and a spring. When the lid is in a right opened state or a left opened state, the erroneous operation preventing device restricts the rods located at the opened side of the lid from moving in an engagement direction of being engaged with the engagement holes, using the interposed member, the position adjustment member, and the spring, thereby restricting the rods located at the closed side of the lid from becoming movable in a disengagement direction of being removed from the engagement holes. Thus, a right opening action and a left opening action of the lid are prevented from being performed simultaneously.

SUMMARY OF INVENTION

Technical Problem

In the double opening console box described in JP2016-112979A, the interposed member is supported movably in the left-right direction relative to the lid. The spring is interposed between the body portion of the lid and the position adjustment member, and energizes the position adjustment member in a direction of being separated from the body portion of the lid. The position adjustment member has a contact surface to movably contact with a guide surface of the interposed member. However, in this double opening console box, the position adjustment member and the spring need to be mounted to the body portion of the lid, separately from the interposed member. Therefore, assemblability of the erroneous operation preventing device is low.

The present invention has been made in view of the above circumstances, and an object of the present invention is to provide a double opening console box that improves assemblability of an erroneous operation preventing device.

Solution to Problem

An aspect of the present invention is directed to a double opening console box including: a box body that has a storage portion having an opening; a lid supported rotatably relative to the box body and configured to perform an opening/closing action between a closed state in which the opening is closed and an opened state in which the opening is opened; and an opening/closing mechanism configured to cause the lid to perform an opening/closing action around one rotation shaft selected from a left rotation shaft extending in a front-rear direction along a left peripheral edge of the opening and a right rotation shaft extending in the front-rear direction along a right peripheral edge of the opening. The opening/closing mechanism includes: a right operation portion attached to a body portion of the lid so as to allow an opening operation, the right operation portion being configured to cause the lid to perform an opening action around the left rotation shaft by the opening operation; a left operation portion attached to the body portion of the lid so as to allow an opening operation, the left operation portion being configured to cause the lid to perform an opening action around the right rotation shaft by the opening operation; and an erroneous operation preventing device configured to prevent the opening action of the lid by the opening operation on the right operation portion and the opening action of the lid by the opening operation on the left operation portion from being performed simultaneously. The erroneous operation preventing device includes: a right projecting portion provided to a right rod that moves rearward or frontward by the opening operation on the right operation portion; a left projecting portion provided to a left rod that moves rearward or frontward by the opening operation on the left operation portion; a center projecting portion provided at a left-right center of the body portion of the lid; an erroneous operation prevention bar extending in a left-right direction and movable in the left-right direction relative to the body portion of the lid; a centering component having a recess groove formed symmetrically between left and right at one end in the front-rear direction; and a spring member interposed between the erroneous operation prevention bar and the centering component and configured to generate an energizing force for energizing the centering component in the front-rear direction relative to the erroneous operation prevention bar so that the center projecting portion is located at a front-rear-direction bottom of the recess groove. The erroneous operation prevention bar includes: a right engagement hole portion with which the right projecting portion is engaged so as to be relatively movable, the right engagement hole portion being formed, at a right part, in such an elongated hole shape as to restrict the opening operation on the right operation portion and the opening operation on the left operation portion from being performed simultaneously; a left engagement hole portion with which the left projecting portion is engaged so as to be relatively movable, the left engagement hole portion being formed, at a left part, in the elongated hole shape; a center through hole portion into which the center projecting portion is inserted so as to be relatively movable, the center through hole portion being provided at a left-right center; and a centering accommodating portion configured to store the spring member such that one end thereof is supported, and store the centering component supporting another end of the spring member, such that front-rear-direction movement of the centering component relative to the erroneous operation prevention bar is allowed and left-right-direction movement of the centering component relative to the erroneous operation prevention bar is prohibited.

In this configuration, the centering component and the spring member of the erroneous operation preventing device are stored in the centering accommodating portion of the erroneous operation prevention bar. Therefore, the erroneous operation prevention bar into which the centering component and the spring member have been attached is to be incorporated into the body portion of the lid. Thus, assemblability thereof is improved.

DESCRIPTION OF EMBODIMENTS

Hereinafter, with reference to FIG. 1 to FIG. 24, a specific embodiment of a double opening console box according to the present invention will be described.

Figure 1:
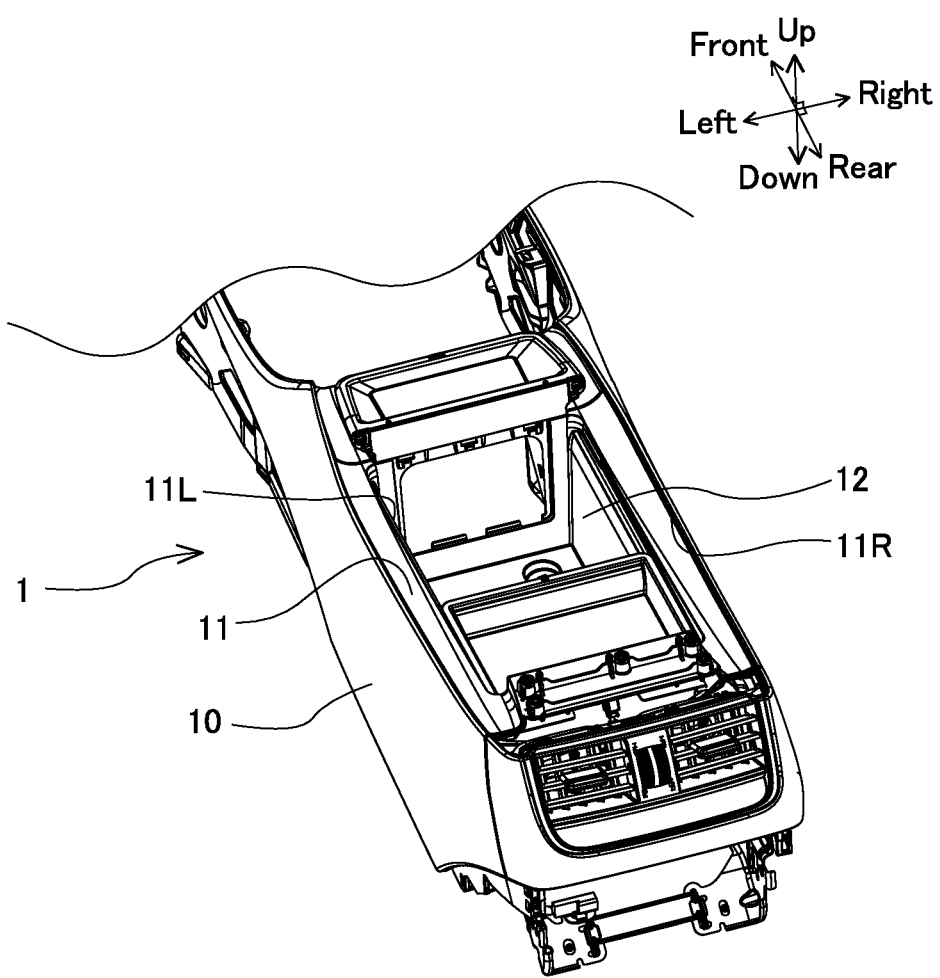
FIG. 1 is a perspective view of a box body of a double opening console box according to an embodiment.
Figure 2:
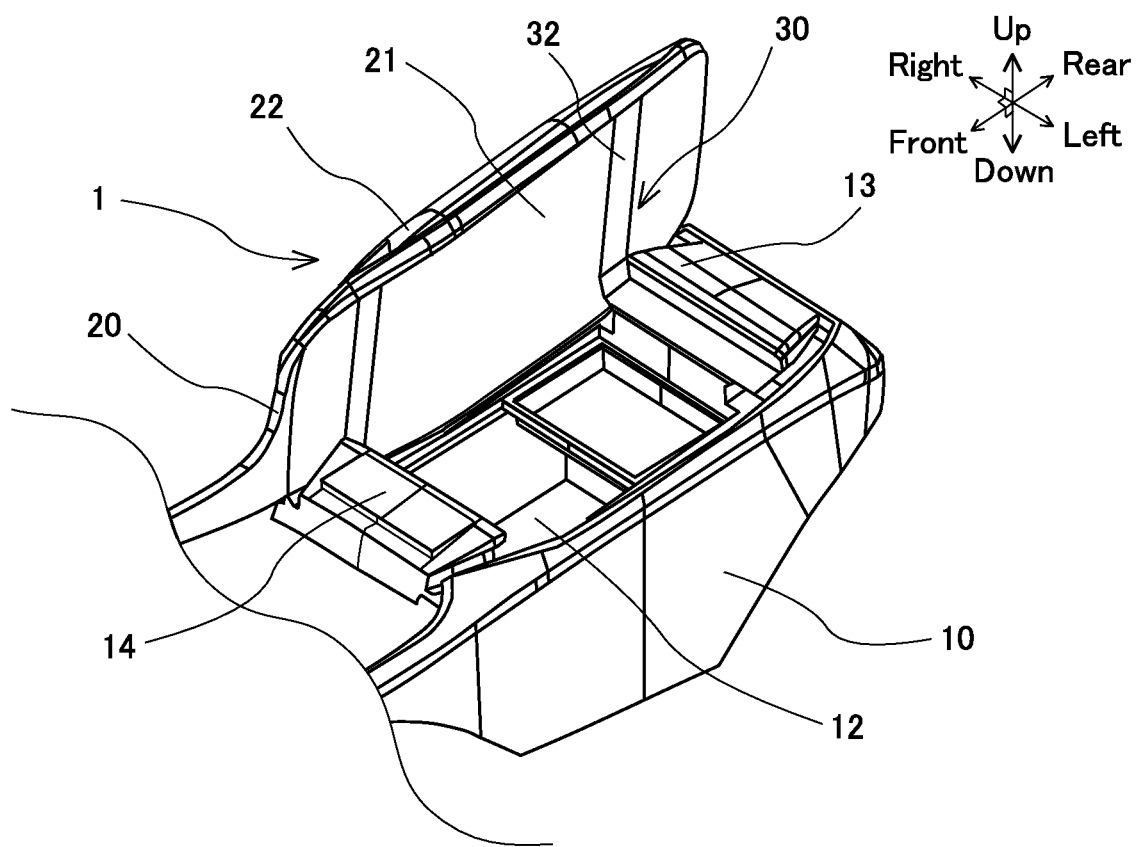
FIG. 2 is a perspective view of a lid of the double opening console box according to the embodiment, in a left opened state.
Figure 3:
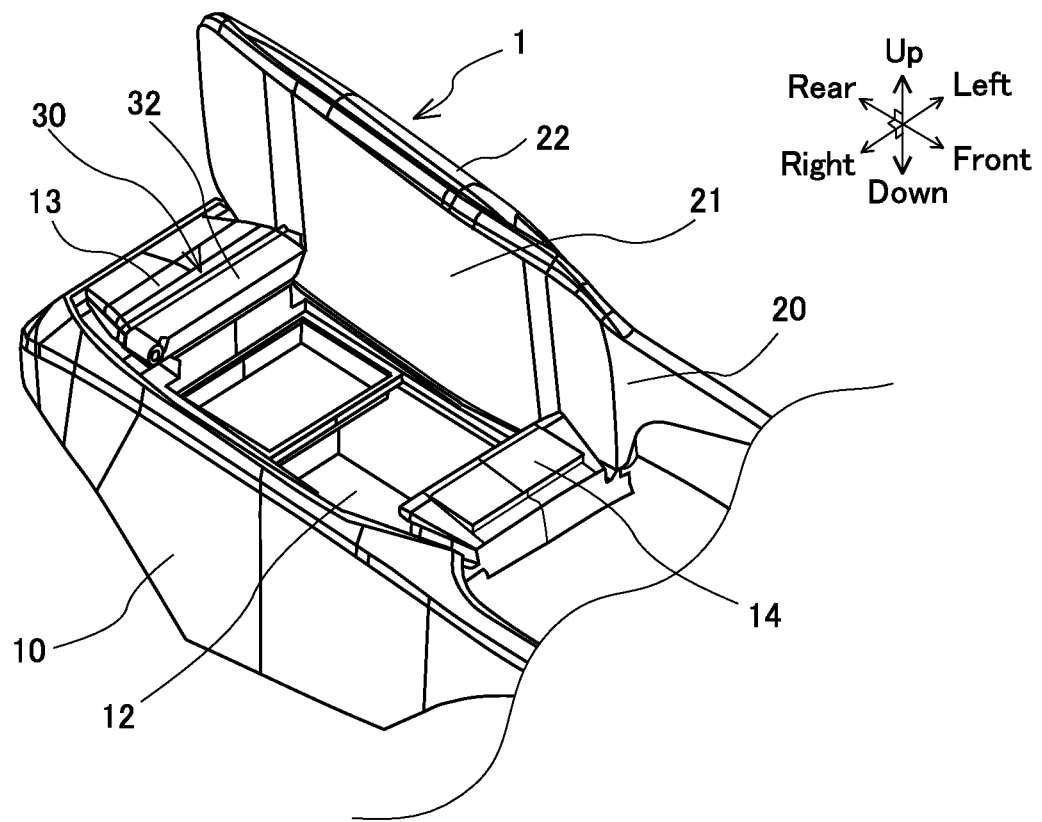
FIG. 3 is a perspective view of the lid of the double opening console box according to the embodiment, in a right opened state.

A double opening console box 1 is a storage device mounted to a center console provided in a compartment of a vehicle, for example. As shown in FIG. 1, FIG. 2, and FIG. 3, the double opening console box 1 includes a box body 10, a lid 20, and an opening/closing mechanism 30. The double opening console box 1 is a device that causes the lid 20 to open/close with respect to the box body 10 by using the opening/closing mechanism 30. The double opening console box 1 may be used as an arm rest on which an occupant puts his/her arm when the lid 20 is in a closed state. In the present embodiment, terms indicating directions are defined with reference to the vehicle to which the double opening console box 1 is mounted, unless there are exceptional circumstances. For example, "right side" refers to the right side of the vehicle with respect to the vehicle advancing direction, and "left side" refers to the left side of the vehicle with respect to the vehicle advancing direction.

The box body 10 is formed in a substantially box shape. The box body 10 is fixed to a vehicle body by being fastened with a bolt, for example. The box body 10 has a storage portion 12 having an opening 11 at an upper surface. The storage portion 12 is formed in a substantially rectangular parallelepiped shape, for example, and is surrounded by side walls and a bottom wall. The box body 10 may include, for example, a frame that accommodates a cup holder or the like. The opening 11 is formed in a substantially rectangular shape. The opening 11 has a side 11L at a left peripheral edge. The opening 11 has a side 11R at a right peripheral edge. The sides 11L, 11R extend in the front-rear direction of the vehicle.

Figure 21:
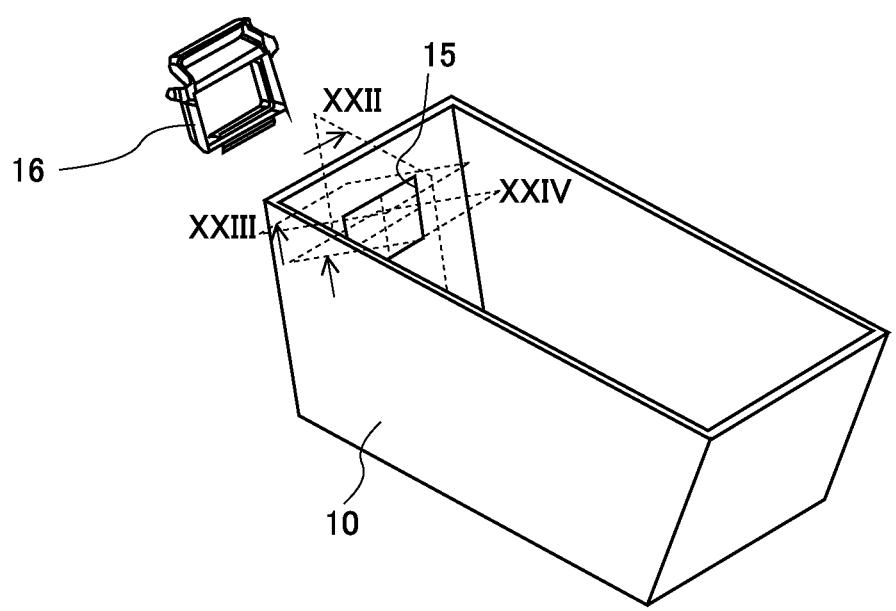
FIG. 21 is a perspective view showing a box body of a double opening console box according to a modification, and a bezel attached to a side wall opening of the box body.

A side wall (e.g., rear side wall) forming the storage portion 12 of the box body 10 has a side wall opening 15 for socket attachment, as shown in FIG. 21. A frame-shaped bezel 16 is attached to the side wall opening 15. The bezel 16 has a larger outer shape than the side wall opening 15. The bezel 16 has an attachment hole provided at the center thereof and used for socket attachment. Further, the bezel 16 has a nail portion 16a provided to at least a part thereof. The nail portion 16a is engageable with an engagement hole portion 17 provided to at least a part of a peripheral edge of the side wall opening 15 of the box body 10.

The bezel 16 is attached to the box body 10 such that the attachment hole communicates with the side wall opening 15 from the outer side. The attachment of the bezel 16 to the box body 10 is performed such that the nail portion 16a is engaged with the engagement hole portion 17. The bezel 16 is fixed to the box body 10 such that a frame portion thereof comes into contact with the peripheral edge of the side wall opening 15 of the box body 10 around the entire perimeter.

A socket (not shown) is inserted into the side wall opening 15 of the box body 10. The socket is inserted into the side wall opening 15 from the inner side, i.e., the storage portion 12, with respect to the box body 10. The socket is fixed by being engaged with the frame portion of the bezel 16. When the socket is to be detached from the box body 10, the socket is extracted to the storage portion 12 side. The bezel 16 is formed such that, when the socket is extracted from the box body 10 to the storage portion 12 side, a force acts in a direction opposite to a direction in which the nail portion 16a is detached from the engagement hole portion 17.

Figure 4:
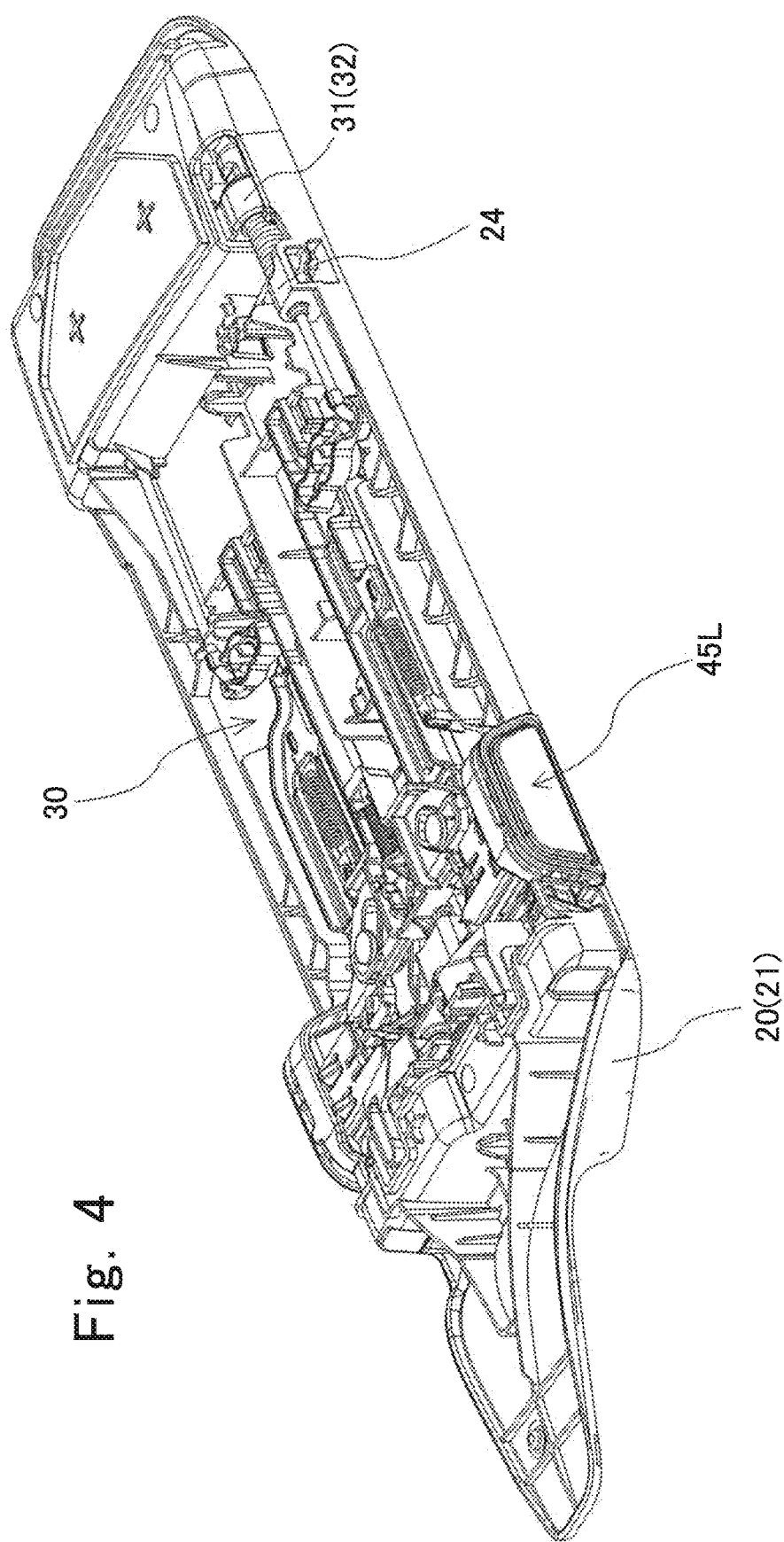
FIG. 4 is a perspective view of an opening/closing mechanism of the double opening console box according to the embodiment.

The lid 20 is formed in a shape including a rectangular portion corresponding to the opening 11 of the box body 10 (e.g., a shape in which an arm rest part on a driver seat side is extended frontward, as shown in FIG. 2, FIG. 3, FIG. 4, etc.). The lid 20 is configured to open/close between a closed state in which the opening 11 of the box body 10 is closed and an opened state in which the opening 11 is opened.

The lid 20 is openable and closable around a rotation shaft (hereinafter, referred to as left rotation shaft) extending in the front-rear direction along the side 11L at the left peripheral edge of the opening 11 (e.g., right opening/closing action), and is openable and closable around a rotation shaft (hereinafter, referred to as right rotation shaft) extending in the front-rear direction along the side 11R at the right peripheral edge of the opening 11 (i.e., left opening/closing action). The lid 20 is openable into an opened state having a predetermined angle (for example, 100°) from a closed state, for both left and right, with respect to the box body 10.

The lid 20 has a lower lid member 21 and an upper lid member 22. The lower lid member 21 has a planar portion formed in a rectangular plate shape, and a side wall portion surrounding a peripheral edge of the planar portion and formed to extend perpendicularly from the planar portion. The upper lid member 22 is formed in a rectangular shape corresponding to the lower lid member 21, and has a rounded shape in the outer appearance thereof. The upper lid member 22 covers the upper surface of the lower lid member 21 and has a cushioning upper surface. The lower lid member 21 and the upper lid member 22 are integrated by recess-projection fitting or the like, to form the lid 20.

Figure 5:
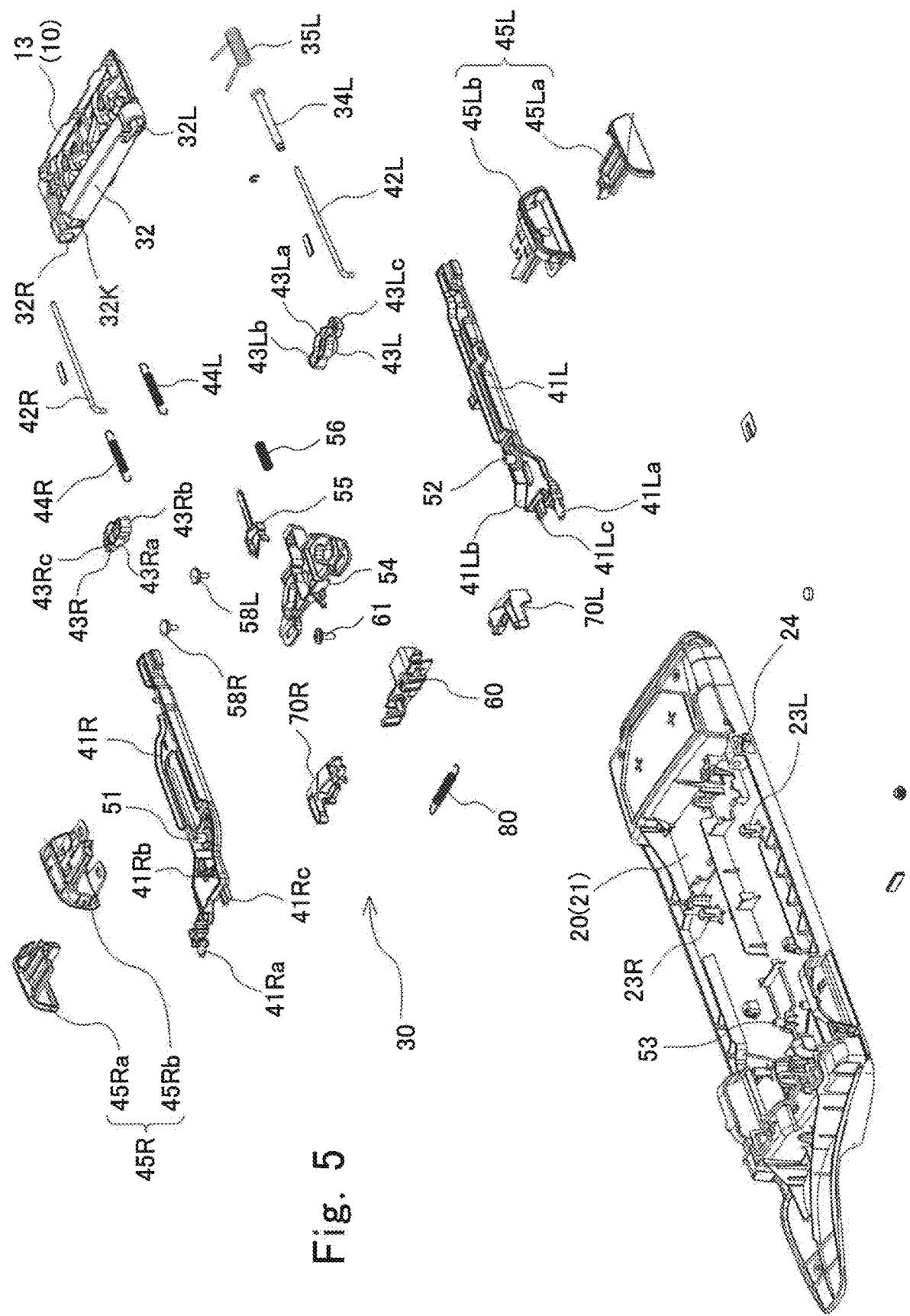
FIG. 5 is an exploded perspective view of the opening/closing mechanism of the double opening console box according to the embodiment.
Figure 6:
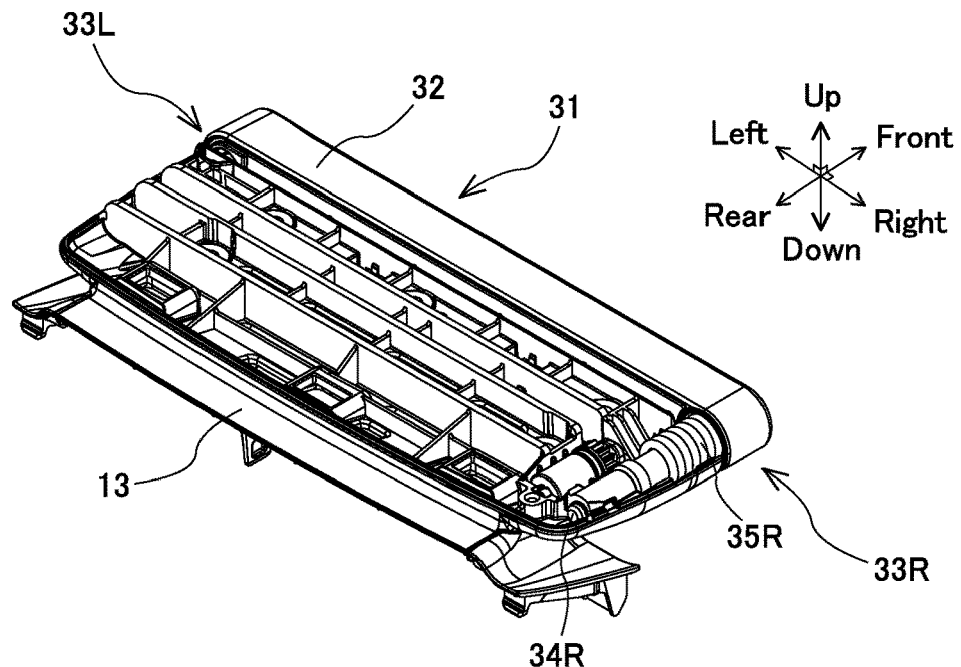
FIG. 6 is a perspective view of an arm unit of the opening/closing mechanism of the double opening console box according to the embodiment.
Figure 7:
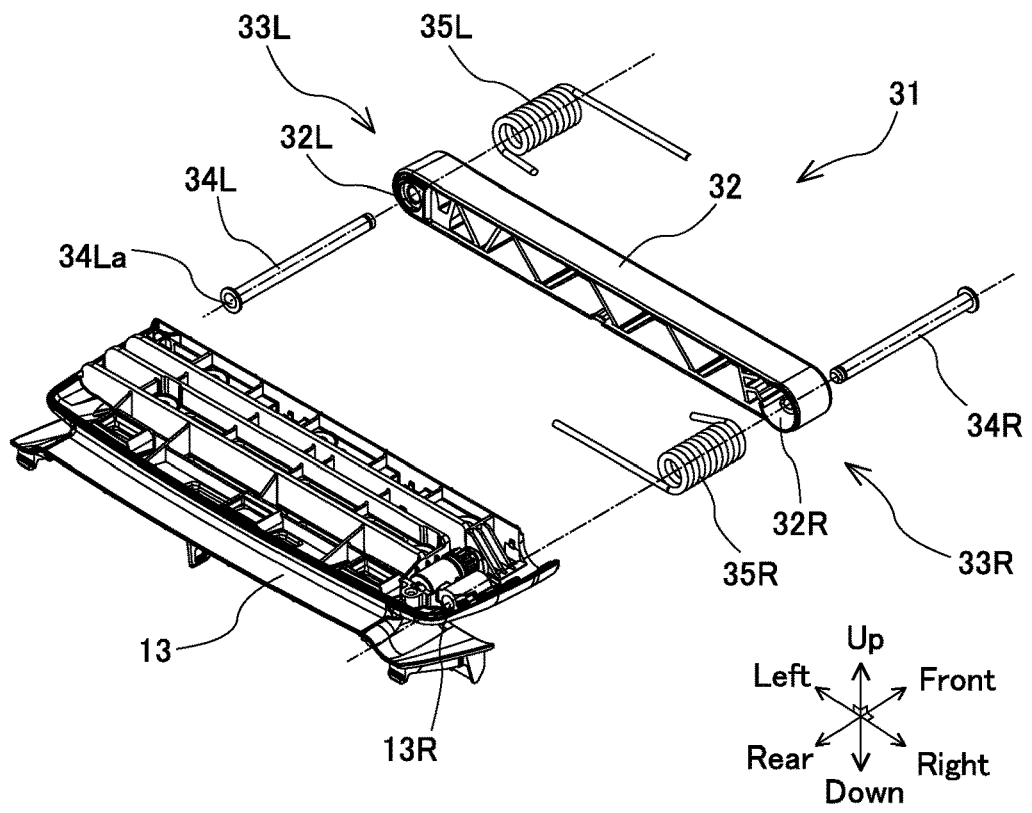
FIG. 7 is an exploded perspective view of the arm unit of the opening/closing mechanism of the double opening console box according to the embodiment.

As shown in FIG. 5, FIG. 6, and FIG. 7, the opening/closing mechanism 30 has an arm unit 31. The arm unit 31 is a unit for causing the lid 20 to open/close around one rotation shaft selected from the left rotation shaft along the side 11L at the left and the right rotation shaft along the side 11R at the right. The arm unit 31 has an arm member 32, a left pivotal support portion 33L, and a right pivotal support portion 33R.

The arm member 32 is a square-bar-like member formed in a long shape. The arm member 32 extends in the left-right direction of the vehicle when the lid 20 is in a closed state. In the long-side direction, the arm member 32 has substantially the same length as the width in the left-right direction of the lid 20. The arm member 32 is located between a rear base portion 13 of the box body 10 and the lid 20, and is interposed between the rear base portion 13 and the lid 20. The arm member 32 is located such that a front surface thereof extends along the side wall formed at the rear side of the lid 20 and a rear surface thereof extends along the side wall formed at the rear side of the storage portion 12 of the box body 10, when the lid 20 is in a closed state.

The arm member 32 is supported at a left end so as to be swingable by the lid 20, and is supported at a right end so as to be swingable by the rear base portion 13 of the box body 10. The arm member 32 is swingable relative to the lid 20 around the left rotation shaft, and is swingable relative to the rear base portion 13 of the box body 10 around the right rotation shaft. The arm member 32 has two through holes 32L, 32R. The through hole 32L is provided at the left end of the arm member 32 and penetrates therethrough in the front-rear direction. The through hole 32R is provided at the right end of the arm member 32 and penetrates therethrough in the front-rear direction. Hereinafter, the through hole 32L is referred to as left through hole 32L, and the through hole 32R is referred to as right through hole 32R.

The left pivotal support portion 33L is located at the left side of the arm member 32. The left pivotal support portion 33L constitutes the left rotation shaft and is a part for causing the lid 20 to perform a right opening/closing action around the left rotation shaft. The left pivotal support portion 33L has a left shaft body 34L and a left arm spring 35L.

The left shaft body 34L is a collar formed in a cylindrical shape. The left shaft body 34L is inserted into the left through hole 32L frontward from the left rear side of the arm member 32. A rear end side of the left shaft body 34L is fixed to the arm member 32. A front end side of the left shaft body 34L protrudes frontward from a front-side opening of the left through hole 32L. The lower lid member 21 of the lid 20 has a support hole (not shown). The front end side of the left shaft body 34L is inserted into the support hole of the lid 20 so as to be supported rotatably relative to the lid 20. The left shaft body 34L extends in the front-rear direction along the left side 11L of the peripheral edge of the opening 11, and serves as the left rotation shaft.

The left shaft body 34L is wound with the left arm spring 35L. The left arm spring 35L is a torsion spring that generates an energizing force for swinging the arm member 32 relative to the lid 20. The energizing force of the left arm spring 35L is maximized when the lid 20 is in a closed state. One end of the left arm spring 35L is fixed to the arm member 32. Another end of the left arm spring 35L is fixed to the lower lid member 21 of the lid 20. The arm member 32 is swingable relative to the lid 20 around the left shaft body 34L by an energizing force of the left arm spring 35L. When the arm member 32 swings relative to the lid 20 (i.e., during a right opening action of the lid 20), an attenuating force for reducing the swinging speed thereof may be applied to the arm member 32 from a damper device.

The right pivotal support portion 33R is located at the right side of the arm member 32. The right pivotal support portion 33R constitutes the right rotation shaft and is a part for causing the lid 20 to perform a left opening/closing action around the right rotation shaft. The right pivotal support portion 33R has a right shaft body 34R and a right arm spring 35R.

The right shaft body 34R is formed in a columnar shape. The right shaft body 34R is inserted into the right through hole 32R rearward from the right front side of the arm member 32. A front end side of the right shaft body 34R is fixed to the arm member 32. A rear end side of the right shaft body 34R protrudes rearward from a rear-side opening of the right through hole 32R. The rear base portion 13 of the box body 10 has an engagement hole 13R at a right end thereof. The rear end side of the right shaft body 34R is inserted into the engagement hole 13R of the rear base portion 13 so as to be supported rotatably relative to the rear base portion 13 of the box body 10. The right shaft body 34R extends in the front-rear direction along the right side 11R of the peripheral edge of the opening 11, and serves as the right rotation shaft.

The right shaft body 34R is wound with the right arm spring 35R. The right arm spring 35R is a torsion spring that generates an energizing force for swinging the arm member 32 relative to the rear base portion 13 of the box body 10. The energizing force of the right arm spring 35R is maximized when the lid 20 is in a closed state. An end of the right arm spring 35R is fixed to the arm member 32. The other end of the right arm spring 35R is fixed to the rear base portion 13 of the box body 10. The arm member 32 is swingable relative to the rear base portion 13 of the box body 10 around the right shaft body 34R by the energizing force of the right arm spring 35R. When the arm member 32 swings relative to the box body 10 (i.e., during a left opening action of the lid 20), an attenuating force for reducing the swinging speed thereof may be applied to the arm member 32 from a damper device.

Figure 8:
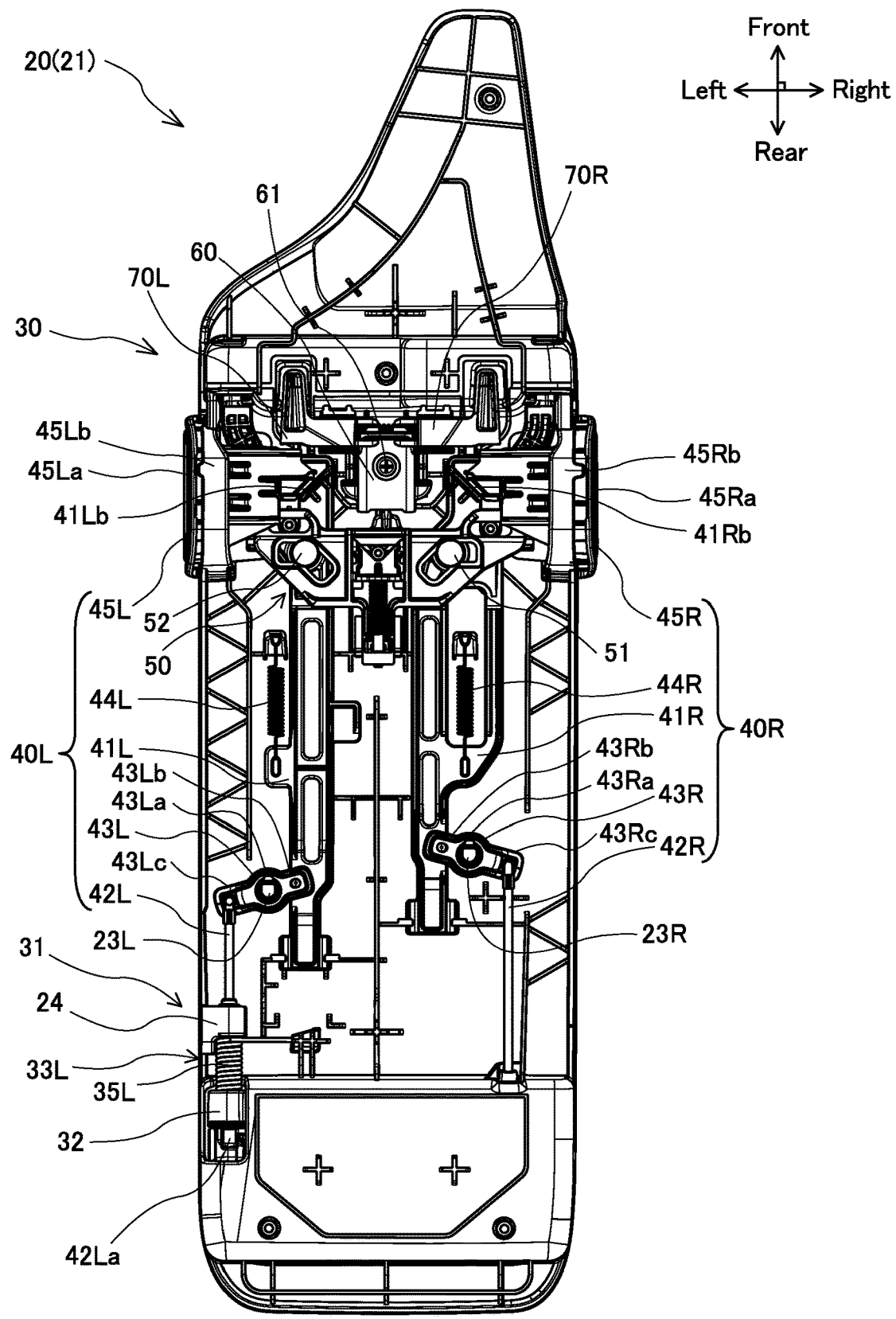
FIG. 8 shows the structure of the opening/closing mechanism of the double opening console box according to the embodiment, when the lid is in a closed state.

As shown in FIG. 8, the opening/closing mechanism 30 has a right lock device 40R and a left lock device 40L. The right lock device 40R and the left lock device 40L are both provided to the lid 20. The right lock device 40R is a device for locking a right part of the lid 20 at a closed position and releasing the locking of the right part at the closed position. The left lock device 40L is a device for locking a left part of the lid 20 at a closed position and releasing the locking of the left part at the closed position.

The right lock device 40R has a right front rod 41R, a right rear rod 42R, a right synchronization member 43R, a right rod energizing member 44R, and a right operation portion 45R. The right front rod 41R is a rod member formed in a band-plate shape and extending in the front-rear direction. The right front rod 41R is provided at a front part of the lid 20 (specifically, the lower lid member 21). The right rear rod 42R is a rod member formed in a rod shape and extending substantially in the front-rear direction. The right rear rod 42R is provided at a rear part of the lid 20 (specifically, the lower lid member 21). The right front rod 41R and the right rear rod 42R are each supported so as to be movable in the front-rear direction relative to the lid 20.

The right front rod 41R is movable in the front-rear direction between a state in which a front end portion 41Ra thereof protrudes frontward of the front end of the body of the lid 20, and a state in which the front end portion 41Ra enters the inside of the body of the lid 20. A front base portion 14 of the box body 10 has an engagement hole 14R in a rear surface at a right end thereof. The front end portion 41Ra of the right front rod 41R is inserted into the engagement hole 14R so as to be engaged therewith. The right front rod 41R is movable in the front-rear direction so as to be engageable and disengageable with and from the engagement hole 14R. The right front rod 41R is engaged with the engagement hole 14R of the front base portion 14 of the box body 10 when the front end portion 41Ra protrudes frontward of the front end of the body of the lid 20, and the right front rod 41R is removed from the engagement hole 14R when the front end portion 41Ra enters the inside of the body of the lid 20. The right front rod 41R serves as the right rotation shaft in a state in which the front end portion 41Ra is engaged with the engagement hole 14R of the front base portion 14.

The right rear rod 42R is movable in the front-rear direction between a state in which a rear end portion 42Ra thereof protrudes rearward of a rear end of the body of the lid 20, and a state in which the rear end portion 42Ra enters the inside of the body of the lid 20. The arm member 32 has an engagement hole 32K in a front surface at a right end thereof. The rear end portion 42Ra of the right rear rod 42R is inserted into the engagement hole 32K so as to be engaged therewith. The right rear rod 42R is movable in the front-rear direction so as to be engageable and disengageable with and from the engagement hole 32K. The right rear rod 42R is engaged with the engagement hole 32K of the arm member 32 when the rear end portion 42Ra protrudes rearward of the rear end of the body of the lid 20, and the right rear rod 42R is removed from the engagement hole 32K when the rear end portion 42Ra enters the inside of the body of the lid 20.

The right synchronization member 43R is located between the right front rod 41R and the right rear rod 42R. The right synchronization member 43R is a member for moving the right front rod 41R and the right rear rod 42R in synchronization with each other in the front-rear direction (specifically, both of a direction of approaching each other and a direction of being separated from each other). The right synchronization member 43R is a cylindrical rotary body rotatably supported by the lower lid member 21 of the lid 20.

Figure 9:
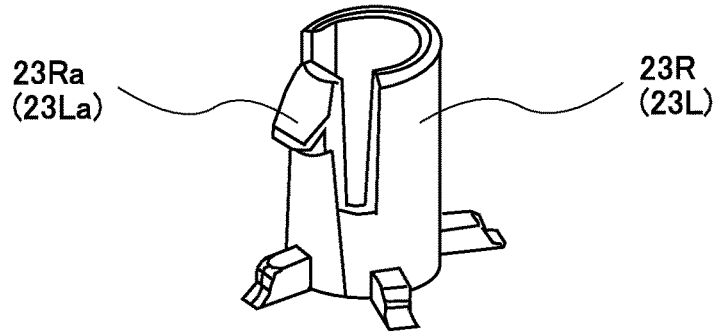
FIG. 9 is a perspective view of a protruding portion, of the lid, for supporting a synchronization member of a lock device of the opening/closing mechanism of the double opening console box according to the embodiment.
Figure 10:
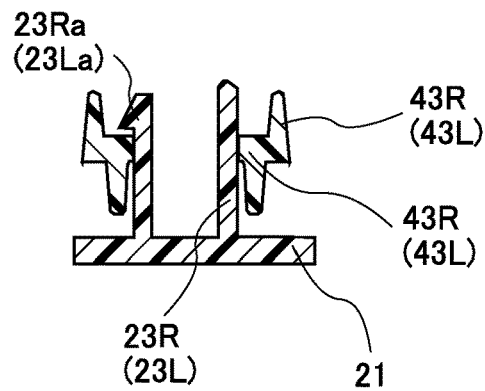
FIG. 10 is a sectional view showing the positional relationship between the protruding portion of the lid and the synchronization member of the lock device of the opening/closing mechanism of the double opening console box according to the embodiment.

The right synchronization member 43R has a cylindrical portion 43Ra having a cylindrical shape, and two wing portions 43Rb, 43Rc each having a wing shape. A protruding portion 23R formed in a cylindrical shape is integrally provided on a surface (i.e., upper surface), of the lower lid member 21 of the lid 20, opposed to the upper lid member 22. The protruding portion 23R protrudes from the upper surface of the lower lid member 21 toward the back surface of the upper lid member 22. As shown in FIG. 9 and FIG. 10, the protruding portion 23R has a fixation nail 23Ra extending in a direction perpendicular to the protruding direction of the protruding portion 23R. The fixation nail 23Ra is provided at a part that is deformable in the direction perpendicular to the protruding direction of the protruding portion 23R. The cylindrical portion 43Ra is inserted and fitted to the protruding portion 23R of the lower lid member 21, and the fixation nail 23Ra is engaged with an end of the cylindrical portion 43Ra, whereby the right synchronization member 43R is rotatably supported by the lower lid member 21.

The wing portion 43Rb of the right synchronization member 43R extends leftward from a left side surface of the cylindrical portion 43Ra. The right front rod 41R is rotatably supported by the wing portion 43Rb. This support is made in such a manner that a projection provided to the right front rod 41R and extending in the up-down direction is fitted to a recess provided to the wing portion 43Rb and extending in the up-down direction. The wing portion 43Rc of the right synchronization member 43R extends rightward from a right side surface of the cylindrical portion 43Ra. A front end portion of the right rear rod 42R is rotatably supported by the wing portion 43Rc. This support is made in such a manner that the front end portion bent from a horizontally-extending body portion of the right rear rod 42R and extending in the up-down direction is fitted to a recess provided to the wing portion 43Rc and extending in the up-down direction. The support point for the right front rod 41R and the support point for the right rear rod 42R in the right synchronization member 43R are separated from each other substantially by 180° in the circumferential direction, and are located substantially symmetrically with each other with respect to the rotation center of the right synchronization member 43R.

The right rod energizing member 44R is a helical spring that generates an energizing force for energizing the right front rod 41R frontward relative to the lid 20. One end of the right rod energizing member 44R is fixed to the right front rod 41R. Another end of the right rod energizing member 44R is fixed to the upper surface of the lower lid member 21 of the lid 20. The energizing force of the right rod energizing member 44R is a force that rotates, via the right front rod 41R, the right synchronization member 43R clockwise (rightward in FIG. 8) as seen from the upper lid member 22 side, and thus energizes the right rear rod 42R rearward relative to the lid 20.

The right operation portion 45R is provided at a right part of the lower lid member 21 of the lid 20. The right operation portion 45R has a button portion 45Ra and a bezel portion 45Rb. The button portion 45Ra is a part to be pressed by an occupant of the vehicle. The button portion 45Ra is provided at the right side wall of the lid 20. The button portion 45Ra is retained so as to be flush with the right side wall of the lid 20 when the button portion 45Ra is not operated by an occupant of the vehicle. The button portion 45Ra is movable leftward relative to the lower lid member 21 of the lid 20 by being pressed leftward by an occupant of the vehicle.

The bezel portion 45Rb is a frame fixed to the lower lid member 21. The button portion 45Ra is inserted into the bezel portion 45Rb so as to advance and retract in the left-right direction. The button portion 45Ra has a rod portion extending leftward. The rod portion has a press slope surface formed by obliquely cutting a rear side of a left end thereof. The right front rod 41R is provided with an operation engagement portion 41Rb. The operation engagement portion 41Rb has an inclined surface facing an obliquely right front side so as to correspond to the press slope surface of the button portion 45Ra. In an initial state in which the button portion 45Ra is retained to be flush with the right side wall of the lid 20, a pressing force is not applied from the press slope surface of the rod left end of the button portion 45Ra to the inclined surface of the operation engagement portion 41Rb of the right front rod 41R, so that the right front rod 41R is maintained at an initial position relative to the lid 20.

On the other hand, when the button portion 45Ra is pressed leftward from the initial state, the press slope surface of the rod left end thereof comes into contact with the inclined surface of the operation engagement portion 41Rb of the right front rod 41R, so that a pressing force is applied to the right front rod 41R so as to move the right front rod 41R rearward. In this case, since the right front rod 41R moves rearward relative to the lid 20, the right synchronization member 43R rotates leftward and the right rear rod 42R moves frontward. The right front rod 41R and the right rear rod 42R each move rearward or frontward by a pressing operation on the right operation portion 45R.

When the lid 20 is in a closed state and the button portion 45Ra of the right operation portion 45R is not pressed leftward, and when the lid 20 is in a left opened state, the front end portion 41Ra of the right front rod 41R protrudes frontward of the front end of the body of the lid 20 and is engaged with the engagement hole 14R of the front base portion 14 of the box body 10. At this time, the rear end portion 42Ra of the right rear rod 42R protrudes rearward of the rear end of the body of the lid 20 and is engaged with the engagement hole 32K of the arm member 32. Hereinafter, this state is referred to as right locked state.

When the button portion 45Ra of the right operation portion 45R is pressed leftward in the right locked state, and when the lid 20 is in a right opened state, the front end portion 41Ra of the right front rod 41R is located rearward of the front end of the body of the lid 20 and enters the inside of the lid 20, so that engagement between the right front rod 41R and the front base portion 14 is released. At this time, by leftward rotation of the right synchronization member 43R, the rear end portion 42Ra of the right rear rod 42R is located frontward of the rear end of the body of the lid 20 and enters the inside of the lid 20, so that engagement between the right rear rod 42R and the arm member 32 is released. Hereinafter, this state is referred to as right lock released state.

The left lock device 40L has a left front rod 41L, a left rear rod 42L, a left synchronization member 43L, a left rod energizing member 44L, and a left operation portion 45L. The left front rod 41L is a rod member formed in a band-plate shape and extending in the front-rear direction. The left front rod 41L is provided at a front part of the lid 20 (specifically, the lower lid member 21). The left rear rod 42L is a rod member formed in a rod shape and extending substantially in the front-rear direction. The left rear rod 42L is provided at a rear part of the lid 20 (specifically, the lower lid member 21). The left front rod 41L and the left rear rod 42L are each supported by the lid 20 so as to be movable in the front-rear direction relative to the lid 20.

The lower lid member 21 of the lid 20 has a retention portion 24 integrally provided at a left rear part thereof. The retention portion 24 is formed in a block shape integrally at the side wall of the lower lid member 21. The retention portion 24 has a through hole 24a penetrating therethrough in the front-rear direction. The left rear rod 42L is inserted into the through hole 24a so as to be movable in the front-rear direction. The left rear rod 42L is inserted into the through hole 24a of the retention portion 24 of the lower lid member 21 so as to be movable in the front-rear direction and thus is supported.

The left front rod 41L is movable in the front-rear direction between a state in which a front end portion 41La thereof protrudes frontward of the front end of the body of the lid 20, and a state in which the front end portion 41La enters the inside of the body of the lid 20. The front base portion 14 of the box body 10 has an engagement hole 14L in a rear surface at a left end thereof. The front end portion 41La of the left front rod 41L is inserted into the engagement hole 14L so as to be engaged therewith. The left front rod 41L is movable in the front-rear direction so as to be engageable and disengageable with and from the engagement hole 14L. The left front rod 41L is engaged with the engagement hole 14L of the front base portion 14 of the box body 10 when the front end portion 41La protrudes frontward of the front end of the body of the lid 20, and the left front rod 41L is removed from the engagement hole 14L when the front end portion 41La enters the inside of the body of the lid 20. The left front rod 41L serves as the left rotation shaft in a state in which the front end portion 41La is engaged with the engagement hole 14L of the front base portion 14.

A rear end portion 42La of the left rear rod 42L is inserted into a through hole 34La formed in the center of the shaft body 34L of the left pivotal support portion 33L. The left rear rod 42L is movable in the front-rear direction between a state in which the rear end portion 42La thereof protrudes rearward of the rear end of the arm member 32 located further rearward of the rear end of the body of the lid 20, and a state in which the rear end portion 42La enters the inside of the arm member 32. The rear base portion 13 of the box body 10 has an engagement hole 13L in a front surface at a left end thereof. The rear end portion 42La of the left rear rod 42L is inserted into the engagement hole 13L so as to be engaged therewith. The left rear rod 42L is movable in the front-rear direction so as to be engageable and disengageable with and from the engagement hole 13L. The left rear rod 42L is engaged with the engagement hole 13L of the rear base portion 13 of the box body 10 when the rear end portion 42La protrudes rearward of the rear end of the arm member 32, and the left rear rod 42L is removed from the engagement hole 13L when the rear end portion 42La enters the inside of the arm member 32.

The left synchronization member 43L is located between the left front rod 41L and the left rear rod 42L. The left synchronization member 43L is a member for moving the left front rod 41L and the left rear rod 42L in synchronization with each other in the front-rear direction (specifically, both of a direction of approaching each other and a direction of being separated from each other). The left synchronization member 43L is a cylindrical rotary body rotatably supported by the lower lid member 21 of the lid 20.

The left synchronization member 43L has a cylindrical portion 43La having a cylindrical shape, and two wing portions 43Lb, 43Lc each having a wing shape. A protruding portion 23L formed in a cylindrical shape is integrally provided on the surface (i.e., upper surface), of the lower lid member 21 of the lid 20, opposed to the upper lid member 22. The protruding portion 23L protrudes from the upper surface of the lower lid member 21 toward the back surface of the upper lid member 22. As shown in FIG. 9 and FIG. 10, the protruding portion 23L has a fixation nail 23La extending in a direction perpendicular to the protruding direction of the protruding portion 23L. The fixation nail 23La is provided at a part that is deformable in the direction perpendicular to the protruding direction of the protruding portion 23L. The cylindrical portion 43La is inserted and fitted to the protruding portion 23L of the lower lid member 21, and the fixation nail 23La is engaged with an end of the cylindrical portion 43La, whereby the left synchronization member 43L is rotatably supported by the lower lid member 21.

The wing portion 43Lb of the left synchronization member 43L extends rightward from a right side surface of the cylindrical portion 43La. The left front rod 41L is rotatably supported by the wing portion 43Lb. This support is made in such a manner that a projection provided to the left front rod 41L and extending in the up-down direction is fitted to a recess provided to the wing portion 43Lb and extending in the up-down direction. The wing portion 43Lc of the left synchronization member 43L extends leftward from a left side surface of the cylindrical portion 43La. A front end portion of the left rear rod 42L is rotatably supported by the wing portion 43Lc. This support is made in such a manner that the front end portion bent from a horizontally-extending body portion of the left rear rod 42L and extending in the up-down direction is fitted to a recess provided to the wing portion 43Lc and extending in the up-down direction. The support point for the left front rod 41L and the support point for the left rear rod 42L in the left synchronization member 43L are separated from each other substantially by 180° in the circumferential direction, and are located substantially symmetrically with each other with respect to the rotation center of the left synchronization member 43L.

The left rod energizing member 44L is a helical spring that generates an energizing force for energizing the left front rod 41L frontward relative to the lid 20. One end of the left rod energizing member 44L is fixed to the left front rod 41L. Another end of the left rod energizing member 44L is fixed to the upper surface of the lower lid member 21 of the lid 20. The energizing force of the left rod energizing member 44L is a force that rotates, via the left front rod 41L, the left synchronization member 43L counterclockwise (leftward in FIG. 8) as seen from the upper lid member 22 side, and thus energizes the left rear rod 42L rearward relative to the lid 20.

The left operation portion 45L is provided at a left part of the lower lid member 21 of the lid 20. The left operation portion 45L has a button portion 45La and a bezel portion 45Lb. The button portion 45La is a part to be pressed by an occupant of the vehicle. The button portion 45La is provided at the left side wall of the lid 20. The button portion 45La is retained so as to be flush with the left side wall of the lid 20 when the button portion 45La is not pressed by an occupant of the vehicle. The button portion 45La is movable rightward relative to the lower lid member 21 of the lid 20 by being pressed rightward by an occupant of the vehicle.

The bezel portion 45Lb is a frame fixed to the lower lid member 21. The button portion 45La is inserted into the bezel portion 45Lb so as to advance and retract in the left-right direction. The button portion 45La has a rod portion extending rightward. The rod portion has a press slope surface formed by obliquely cutting a rear side of a right end thereof. The left front rod 41L is provided with an operation engagement portion 41Lb. The operation engagement portion 41Lb has an inclined surface facing an obliquely left front side so as to correspond to the press slope surface of the button portion 45La. In an initial state in which the button portion 45La is retained to be flush with the left side wall of the lid 20, a pressing force is not applied from the press slope surface of the rod right end of the button portion 45La to the inclined surface of the operation engagement portion 41Lb of the left front rod 41L, so that the left front rod 41L is maintained at an initial position relative to the lid 20.

On the other hand, when the button portion 45La is pressed rightward from the initial state, the press slope surface of the rod right end thereof comes into contact with the inclined surface of the operation engagement portion 41Lb of the left front rod 41L, so that an energizing force is applied to the left front rod 41L so as to move the left front rod 41L rearward. In this case, since the left front rod 41L moves rearward relative to the lid 20, the left synchronization member 43L rotates rightward and the left rear rod 42L moves frontward. The left front rod 41L and the left rear rod 42L each move rearward or frontward by a pressing operation on the left operation portion 45L.

When the lid 20 is in a closed state and the button portion 45La of the left operation portion 45L is not pressed rightward, and when the lid 20 is in a right opened state, the front end portion 41La of the left front rod 41L protrudes frontward of the front end of the body of the lid 20 and is engaged with the engagement hole 14L of the front base portion 14 of the box body 10. At this time, the rear end portion 42La of the left rear rod 42L protrudes rearward of the rear end of the arm member 32 and is engaged with the engagement hole 13L of the rear base portion 13 of the box body 10 through the arm member 32. Hereinafter, this state is referred to as left locked state.

When the button portion 45La of the left operation portion 45L is pressed rightward in the left locked state, and when the lid 20 is in a left opened state, the front end portion 41La of the left front rod 41L is located rearward of the front end of the body of the lid 20 and enters the inside of the lid 20, so that engagement between the left front rod 41L and the front base portion 14 is released. At this time, by rightward rotation of the left synchronization member 43L, the rear end portion 42La of the left rear rod 42L is located frontward of the rear end of the arm member 32 and enters the inside of the arm member 32, so that engagement between the left rear rod 42L and the rear base portion 13 is released. Hereinafter, this state is referred to as left lock released state.

Figure 11:
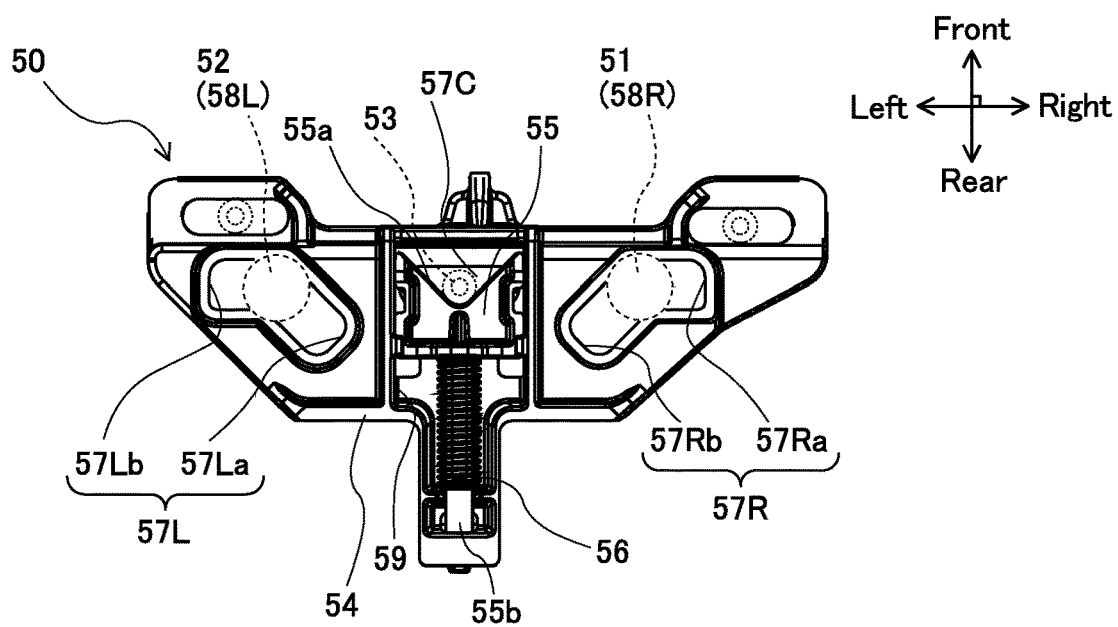
FIG. 11 is a top view of an erroneous operation preventing device of the opening/closing mechanism of the double opening console box according to the embodiment.

The opening/closing mechanism 30 further has an erroneous operation preventing device 50. The erroneous operation preventing device 50 prevents an opening operation on the right operation portion 45R and an opening operation on the left operation portion 45L from being performed simultaneously, that is, prevents synchronous movements of the right front rod 41R and the right rear rod 42R in the front-rear direction and synchronous movements of the left front rod 41L and the left rear rod 42L in the front-rear direction from being performed simultaneously. When one of the right lock device 40R and the left lock device 40L is in a lock released state, the erroneous operation preventing device 50 inhibits the other one from changing from a locked state to a lock released state. As shown in FIG. 5 and FIG. 11, the erroneous operation preventing device 50 has a right projecting portion 51, a left projecting portion 52, a center projecting portion 53, an erroneous operation prevention bar 54, a centering component 55, and a spring member 56.

The right projecting portion 51 is provided on the upper surface of the right front rod 41R. The left projecting portion 52 is provided on the upper surface of the left front rod 41L. The center projecting portion 53 is provided at the left-right center on the upper surface of the lower lid member 21. The right projecting portion 51, the left projecting portion 52, and the center projecting portion 53 are pins projecting toward the back surface of the upper lid member 22.

As shown in FIG. 11, the erroneous operation prevention bar 54 is a plate-shaped member extending in the left-right direction. The erroneous operation prevention bar 54 is supported by the lower lid member 21 so as to be movable in the left-right direction relative to the lower lid member 21 of the lid 20. When the lid 20 is in a right opened state so that the right lock device 40R is in a right lock released state, the erroneous operation prevention bar 54 restricts an opening operation on the left operation portion 45L, to maintain the left lock device 40L in a left locked state, and when the lid 20 is in a left opened state so that the left lock device 40L is in a left lock released state, the erroneous operation prevention bar 54 restricts an opening operation on the right operation portion 45R, to maintain the right lock device 40R in a right locked state.

The erroneous operation prevention bar 54 has a right engagement hole portion 57R, a left engagement hole portion 57L, and a center through hole portion 57C. The right engagement hole portion 57R, the left engagement hole portion 57L, and the center through hole portion 57C are holes penetrating a surface opposed to the lower lid member 21. The right engagement hole portion 57R is provided at a right part of the body of the erroneous operation prevention bar 54. The left engagement hole portion 57L is provided at a left part of the body of the erroneous operation prevention bar 54. The center through hole portion 57C is provided at a left-right center part of the body of the erroneous operation prevention bar 54.

The right engagement hole portion 57R and the left engagement hole portion 57L are formed so as to restrict an opening operation on the right operation portion 45R and an opening operation on the left operation portion 45L from being performed simultaneously. Specifically, the right engagement hole portion 57R and the left engagement hole portion 57L are each formed in an elongated hole shape.

The right engagement hole portion 57R has a straight portion 57Ra and an inclined portion 57Rb. The left engagement hole portion 57L has a straight portion 57La and an inclined portion 57Lb. The straight portions 57Ra, 57La each extend in the left-right direction. The inclined portion 57Rb is contiguous to the left end (i.e., the left-right center side of the lid 20) of the straight portion 57Ra, and is formed integrally with the straight portion 57Ra. The inclined portion 57Rb extends from the left end of the straight portion 57Ra in a direction inclined toward the left rear side with respect to the straight portion 57Ra. The inclined portion 57Lb is contiguous to the right end (i.e., the left-right center side of the lid 20) of the straight portion 57La, and is formed integrally with the straight portion 57La. The inclined portion 57Lb extends from the right end of the straight portion 57La in a direction inclined toward the right rear side with respect to the straight portion 57La.

The right projecting portion 51 provided to the right front rod 41R is inserted into the right engagement hole portion 57R. The right projecting portion 51 is inserted into the right engagement hole portion 57R so as to be located near the boundary between the straight portion 57Ra and the inclined portion 57Rb when the lid 20 is in a closed state. The right projecting portion 51 is a columnar pin extending from the upper surface of the right front rod 41R toward the back surface of the upper lid member 22. The right projecting portion 51 is movable relative to the erroneous operation prevention bar 54, in the right engagement hole portion 57R. Removal of the right projecting portion 51 may be prevented by a removal preventing pin 58R so that the right projecting portion 51 is not removed from the right engagement hole portion 57R after the right projecting portion 51 is inserted into the right engagement hole portion 57R.

The straight portion 57Ra of the right engagement hole portion 57R has a front-rear-direction length substantially equal to the front-rear-direction length (i.e., outer diameter) of the right projecting portion 51 so that the right projecting portion 51 is not allowed to relatively move in the front-rear direction, and has a left-right-direction length longer than the left-right-direction length (i.e., outer diameter) of the right projecting portion 51 so that the right projecting portion 51 is relatively movable in the left-right direction. The inclined portion 57Rb of the right engagement hole portion 57R has such a width that does not allow the right projecting portion 51 to relatively move in the short-side direction, and has such a length that allows the right projecting portion 51 to relatively move in the long-side direction.

The left projecting portion 52 provided to the left front rod 41L is inserted into the left engagement hole portion 57L. The left projecting portion 52 is inserted into the left engagement hole portion 57L so as to be located near the boundary between the straight portion 57La and the inclined portion 57Lb when the lid 20 is in a closed state. The left projecting portion 52 is a columnar pin extending from the upper surface of the left front rod 41L toward the back surface of the upper lid member 22. The left projecting portion 52 is movable relative to the erroneous operation prevention bar 54, in the left engagement hole portion 57L. Removal of the left projecting portion 52 may be prevented by a removal preventing pin 58L so that the left projecting portion 52 is not removed from the left engagement hole portion 57L after the left projecting portion 52 is inserted into the left engagement hole portion 57L.

The straight portion 57La of the left engagement hole portion 57L has a front-rear-direction length substantially equal to the front-rear-direction length (i.e., outer diameter) of the left projecting portion 52 so that the left projecting portion 52 is not allowed to relatively move in the front-rear direction, and has a left-right-direction length longer than the left-right-direction length (i.e., outer diameter) of the left projecting portion 52 so that the left projecting portion 52 is relatively movable in the left-right direction. The inclined portion 57Lb of the left engagement hole portion 57L has such a width that does not allow the left projecting portion 52 to relatively move in the short-side direction, and has such a length that allows the left projecting portion 52 to relatively move in the long-side direction.

In a right locked state (i.e., either a closed state or a left opened state of the lid 20), the right projecting portion 51 is located in the straight portion 57Ra of the right engagement hole portion 57R. From this state, when the right operation portion 45R is pressed leftward and the right front rod 41R moves rearward, the right projecting portion 51 moves relative to the right engagement hole portion 57R, to enter the inclined portion 57Rb of the right engagement hole portion 57R. When the right projecting portion 51 enters the inclined portion 57Rb of the right engagement hole portion 57R, the erroneous operation prevention bar 54 moves rightward relative to the right front rod 41R, in other words, relative to the lower lid member 21 of the lid 20. In this case, the left projecting portion 52 of the left front rod 41L and the left engagement hole portion 57L of the erroneous operation prevention bar 54 move relative to each other, so that the left projecting portion 52 moves to a deeper side in the straight portion 57La of the left engagement hole portion 57L. Thus, the position of the left projecting portion 52 in the left engagement hole portion 57L is maintained within the straight portion 57La.

In a left locked state (i.e., either a closed state or a right opened state of the lid 20), the left projecting portion 52 is located in the straight portion 57La of the left engagement hole portion 57L. From this state, when the left operation portion 45L is pressed rightward and the left front rod 41L moves rearward, the left projecting portion 52 moves relative to the left engagement hole portion 57L, to enter the inclined portion 57Lb of the left engagement hole portion 57L. When the left projecting portion 52 enters the inclined portion 57Lb of the left engagement hole portion 57L, the erroneous operation prevention bar 54 moves leftward relative to the left front rod 41L, in other words, relative to the lower lid member 21 of the lid 20. In this case, the right projecting portion 51 of the right front rod 41R and the right engagement hole portion 57R of the erroneous operation prevention bar 54 move relative to each other, so that the right projecting portion 51 moves to a deeper side in the straight portion 57Ra of the right engagement hole portion 57R. Thus, the position of the right projecting portion 51 in the right engagement hole portion 57R is maintained within the straight portion 57Ra.

The center projecting portion 53 provided to the lower lid member 21 of the lid 20 is inserted into the center through hole portion 57C. The center projecting portion 53 is a columnar pin extending from the upper surface of the lower lid member 21 toward the back surface of the upper lid member 22. The center projecting portion 53 is movable relative to the erroneous operation prevention bar 54, in the center through hole portion 57C.

Further, the erroneous operation prevention bar 54 has a centering accommodating portion 59. The centering accommodating portion 59 is a part formed in a frame shape so as to accommodate the centering component 55 and the spring member 56. The centering accommodating portion 59 stores the spring member 56 such that one end (specifically, rear end) thereof is supported, and stores the centering component 55 supporting another end (specifically, front end) of the spring member 56, such that front-rear-direction movement of the centering component 55 relative to the erroneous operation prevention bar 54 is allowed and left-right-direction movement thereof relative to the erroneous operation prevention bar 54 is prohibited.

The centering component 55 has a recess groove 55a. The recess groove 55a is formed at a front end of the centering component 55. The recess groove 55a is a groove cut in a V shape that is symmetric between left and right, and has inclined surfaces from the left-right center, i.e., the rear end bottom, to left and right parts. The centering component 55 is supported at a neutral position where the erroneous operation prevention bar 54 is centered relative to the lid 20 and the right and left button portions 45Ra, 45La are flush with the side walls of the lid 20, when the center projecting portion 53 of the lower lid member 21 is located at the rear end bottom of the recess groove 55*a*. When the erroneous operation prevention bar 54 moves leftward or rightward from the centering position relative to the lid 20, the center projecting portion 53 of the lower lid member 21 moves along the inclined surface of the recess groove 55*a*.

The centering component 55 has a rod-shaped portion 55*b*. The rod-shaped portion 55*b* is wound with the spring member 56. The spring member 56 is interposed between the erroneous operation prevention bar 54 and the centering component 55. The spring member 56 is a coil spring extending in the front-rear direction, and having one end fixed to the centering accommodating portion 59 of the erroneous operation prevention bar 54, and another end fixed to the centering component 55. The spring member 56 generates an energizing force for energizing the centering component 55 frontward relative to the erroneous operation prevention bar 54. When the lid 20 is in a closed state, the energizing force causes the centering component 55 to move frontward relative to the erroneous operation prevention bar 54 so that the center projecting portion 53 of the lower lid member 21 is located at the rear end bottom of the recess groove 55*a* of the centering component 55. The energizing force increases with increase in the movement amount (i.e., movement distance from the rear end bottom of the recess groove 55*a*) by which the center projecting portion 53 of the lower lid member 21 moves along the inclined surface of the recess groove 55*a* as described above. The energizing force serves as a reaction force against an opening operation on the right operation portion 45R or the left operation portion 45L.

Figure 12:
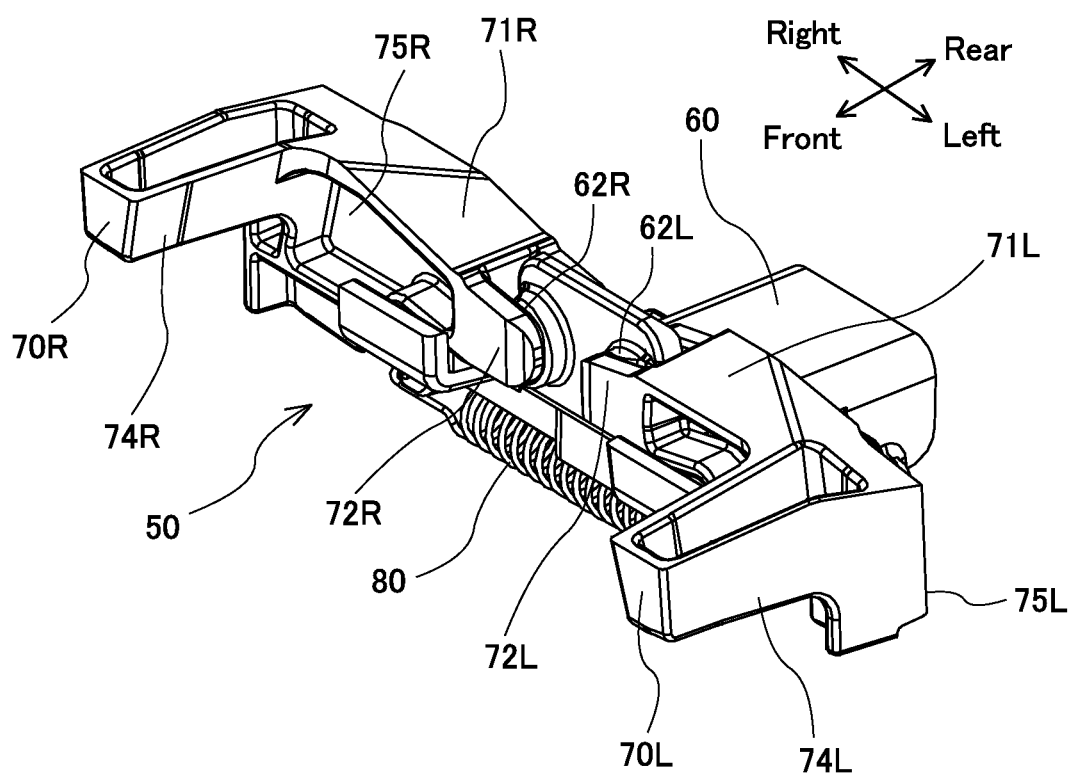
FIG. 12 is a perspective view of a specific part of the erroneous operation preventing device of the opening/closing mechanism of the double opening console box according to the embodiment.

The erroneous operation preventing device 50 further has a base member 60, a right stopper 70R, a left stopper 70L, and a spring member 80, as shown in FIG. 5 and FIG. 12. The base member 60, the right stopper 70R, the left stopper 70L, and the spring member 80 are integrally assembled together so as to be unitized.

The base member 60 is a block-shaped member fixed to the lower lid member 21 of the lid 20 by a bolt 61, etc. The base member 60 is attached at the left-right center of the lid 20 and is located at the front end side of the lid 20. The base member 60 has two shaft holes 62R, 62L each extending in the front-rear direction. The two shaft holes 62R, 62L are arranged side by side at the right and the left. The shaft hole 62R is a hole for rotatably supporting the right stopper 70R. The shaft hole 62L is a hole for rotatably supporting the left stopper 70L. The base member 60 rotatably supports each of the right stopper 70R and the left stopper 70L.

The right stopper 70R is a member that allows the right front rod 41R to be engaged with the front base portion 14 of the box body 10 when the lid 20 is in a right closed state, and restricts the right front rod 41R from moving frontward so as to restrict the right front rod 41R from being engaged with the front base portion 14 of the box body 10 when the lid 20 is in a right opened state. That is, even when a pressing operation on the right operation portion 45R is canceled in the right opened state of the lid 20, the right stopper 70R maintains the position of the right front rod 41R relative to the lid 20, in other words, relative to the erroneous operation prevention bar 54, at a released position where the engagement with the engagement hole 14R has been released at the time of the pressing operation. The right stopper 70R is located at the right with respect to the base member 60. The right stopper 70R has a body portion 71R and a shaft portion 72R.

The body portion 71R is a part extending in a wing shape in the left-right direction. The shaft portion 72R is a cylindrical part that extends in the front-rear direction and is inserted into the shaft hole 62R of the base member 60. The shaft portion 72R is provided at a left end of the body portion 71R. The right stopper 70R is located with respect to the base member 60 such that the shaft portion 72R is inserted into the shaft hole 62R.

The left stopper 70L is a member that allows the left front rod 41L to be engaged with the front base portion 14 of the box body 10 when the lid 20 is in a left closed state, and restricts the left front rod 41L from moving frontward so as to restrict the left front rod 41L from being engaged with the front base portion 14 of the box body 10 when the lid 20 is in a left opened state. That is, even when a pressing operation on the left operation portion 45L is canceled in the left opened state of the lid 20, the left stopper 70L maintains the position of the left front rod 41L relative to the lid 20, in other words, relative to the erroneous operation prevention bar 54, at a released position where the engagement with the engagement hole 14L has been released at the time of the pressing operation. The left stopper 70L is located on a side opposite to the right stopper 70R, i.e., at the left with respect to the base member 60. The left stopper 70L has a body portion 71L and a shaft portion 72L.

The body portion 71L is a part extending in a wing shape in the left-right direction. The shaft portion 72L is a cylindrical part that extends in the front-rear direction and is inserted into the shaft hole 62L of the base member 60. The shaft portion 72L is provided at a right end of the body portion 71L. The left stopper 70L is located with respect to the base member 60 such that the shaft portion 72L is inserted into the shaft hole 62L.

Figure 13:
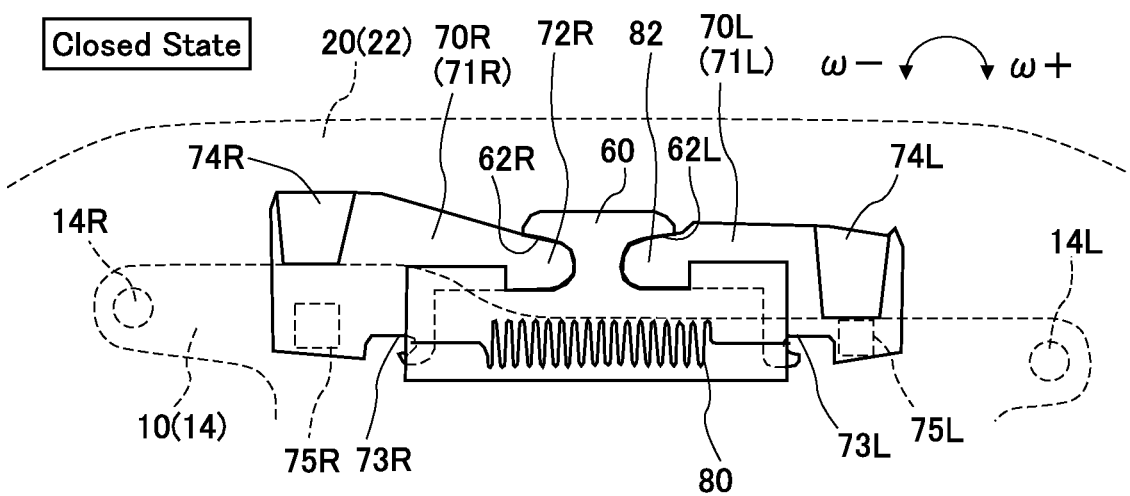
FIG. 13 illustrates the operation state of the erroneous operation preventing device of the double opening console box according to the embodiment, when the lid is in a closed state.

As shown in FIG. 13, the right stopper 70R has a spring fixation portion 73R to which one end of the spring member 80 is fixed. The left stopper 70L has a spring fixation portion 73L to which another end of the spring member 80 is fixed. At least one of the spring fixation portion 73R of the right stopper 70R and the spring fixation portion 73L of the left stopper 70L is provided at a position different from a position on a line connecting the centers of the shaft portions 72R, 72L in a state in which the left stopper 70L and the right stopper 70R are supported by the base member 60. Specifically, the spring fixation portions 73R, 73L are both provided below the shaft portions 72R, 72L and under the body portions 71R, 71L.

One end of the spring member 80 is fixed to the spring fixation portion 73R of the right stopper 70R. Another end of the spring member 80 is fixed to the spring fixation portion 73L of the left stopper 70L. The spring member 80 is a member that generates an energizing force for rotating the right stopper 70R and the left stopper 70L in directions opposite to each other around the shaft portions 72R, 72L, respectively. Specifically, the spring member 80 generates an energizing force that rotates the right stopper 70R around the shaft portion 72R in a counterclockwise direction ω− as seen from the front side, to push down the right side of the right stopper 70R relative to the lower lid member 21, and rotates the left stopper 70L around the shaft portion 72L in a clockwise direction ω+ as seen from the front side, to push down the left side of the left stopper 70L relative to the lower lid member 21. The right stopper 70R and the left stopper 70L each have a push-down restricting portion for restricting the pushing-down performed by the energizing force of the spring member 80, at a predetermined position.

The right stopper 70R has a rotation restricting portion 74R. When the lid 20 is in a right opened state, the rotation restricting portion 74R allows the right stopper 70R to rotate in the counterclockwise direction ω− by an energizing force of the spring member 80, and when the lid 20 is in a right closed state, the rotation restricting portion 74R restricts the right stopper 70R from rotating in the counterclockwise direction ω−, against an energizing force of the spring member 80. The rotation restricting portion 74R is contactable with the upper surface of the front base portion 14 of the box body 10, and protrudes frontward from the body portion 71R.

As shown in FIG. 13, the rotation restricting portion 74R comes into contact with the upper surface of the front base portion 14 when the lid 20 is not in a right opened state, i.e., is in a right closed state. In a state in which the rotation restricting portion 74R is in contact with the upper surface of the front base portion 14, the right stopper 70R is restricted from rotating in the counterclockwise direction ω− by an energizing force of the spring member 80, i.e., being pushed down relative to the lower lid member 21. On the other hand, when the lid 20 is in a right opened state, the rotation restricting portion 74R is separated from the upper surface of the front base portion 14. When the rotation restricting portion 74R is separated from the upper surface of the front base portion 14, the right stopper 70R rotates in the counterclockwise direction ω− by an energizing force of the spring member 80 so as to be pushed down relative to the lower lid member 21.

The right stopper 70R has a displacement restricting portion 75R. When the lid 20 is in a right closed state, the displacement restricting portion 75R does not come into contact with a restriction portion 41Rc provided at a front part of the right front rod 41R. When the lid 20 is in a right opened state, the displacement restricting portion 75R comes into contact with the restriction portion 41Rc of the right front rod 41R. The displacement restricting portion 75R is provided integrally with the body portion 71R and is formed to have a surface portion facing rearward. When the displacement restricting portion 75R does not come into contact with the restriction portion 41Rc of the right front rod 41R, frontward movement of the right front rod 41R by an energizing force of the right rod energizing member 44R is allowed, so that engagement between the right front rod 41R and the engagement hole 14R is allowed. On the other hand, when the displacement restricting portion 75R comes into contact with the restriction portion 41Rc of the right front rod 41R, frontward movement of the right front rod 41R by an energizing force of the right rod energizing member 44R is restricted, so that the right front rod 41R and the engagement hole 14R are restricted from being engaged with each other, against an energizing force of the right rod energizing member 44R.

Figure 15:
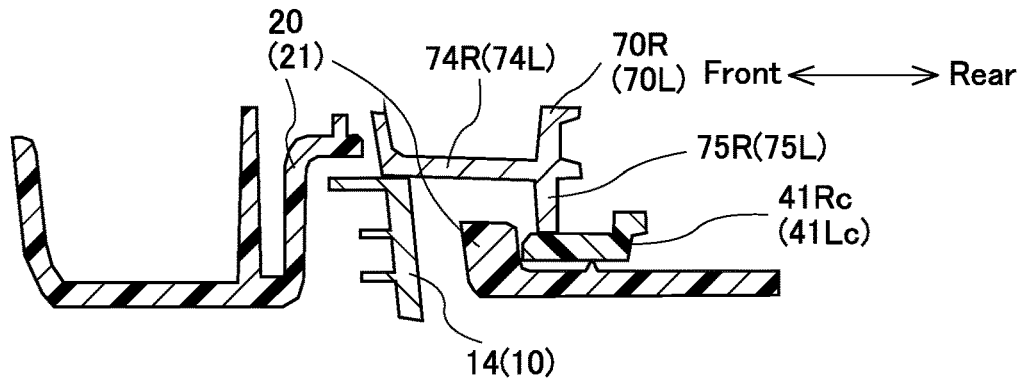
FIG. 15 is a sectional view of the erroneous operation preventing device of the double opening console box according to the embodiment, when the lid is in a closed state.

When the lid 20 is not in a right opened state, i.e., is in a right closed state, as shown in FIG. 15, the right stopper 70R is not pushed down relative to the lower lid member 21, due to rotation restriction by the rotation restricting portion 74R. Thus, the displacement restricting portion 75R is not at a contactable position with respect to the restriction portion 41Rc of the right front rod 41R. At this time, the right front rod 41R is energized frontward by an energizing force of the right rod energizing member 44R, without coming into contact with the displacement restricting portion 75R, so that engagement between the right front rod 41R and the engagement hole 14R is allowed. Thus, when the lid 20 is in a right closed state, a right locked state is established.

Figure 16:
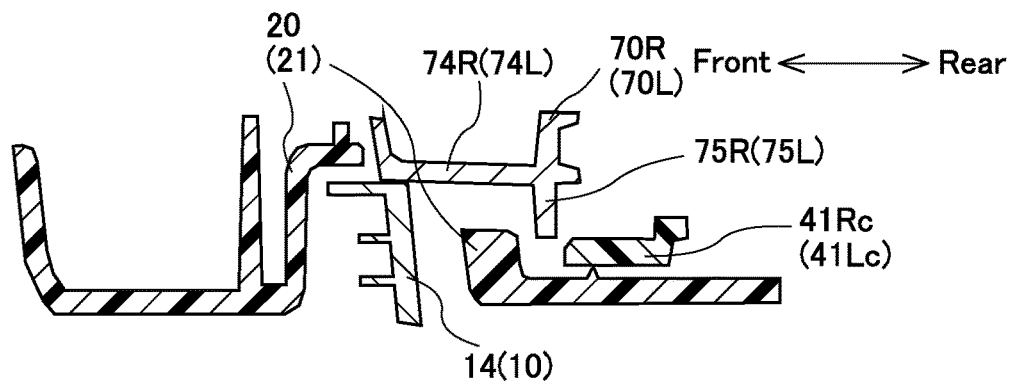
FIG. 16 is a sectional view of the erroneous operation preventing device of the double opening console box according to the embodiment, when an opening operation is performed on an operation portion.
Figure 17:
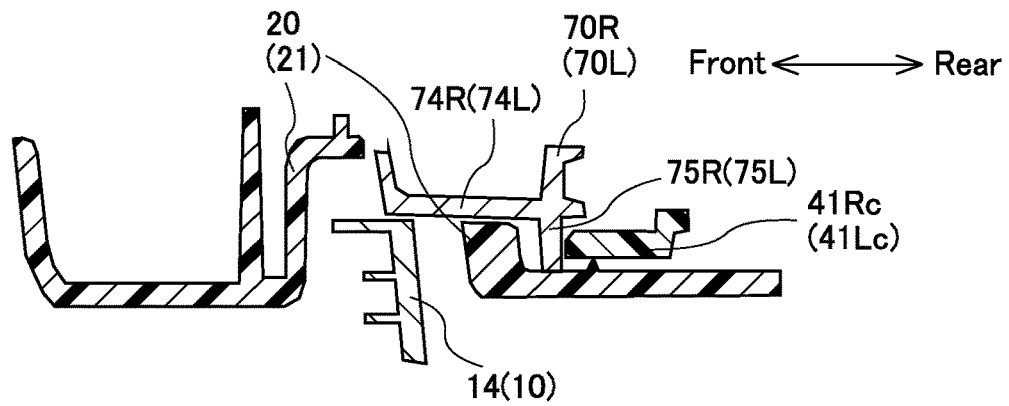
FIG. 17 is a sectional view of the erroneous operation preventing device of the double opening console box according to the embodiment, when the lid is in an opened state.

On the other hand, when the right operation portion 45R is pressed leftward from the closed state of the lid 20, first, as shown in FIG. 16, the right front rod 41R moves rearward and the restriction portion 41Rc thereof also moves rearward. Then, when engagement between the box body 10 or the arm member 32, and the right front rod 41R and the right rear rod 42R, is released so that the right lock device 40R comes into a right lock released state (i.e., right opened state), as shown in FIG. 17, rotation restriction by the rotation restricting portion 74R is released and the right stopper 70R is pushed down relative to the lower lid member 21 by an energizing force of the spring member 80, so that the displacement restricting portion 75R comes to a contactable position with respect to the restriction portion 41Rc of the right front rod 41R. At this time, even when the right front rod 41R is energized frontward by an energizing force of the right rod energizing member 44R, the right front rod 41R comes into contact with the displacement restricting portion 75R and thus is not allowed to move any more, whereby the right front rod 41R and the engagement hole 14R are restricted from being engaged with each other.

Therefore, once the lid 20 comes into a right opened state by a leftward pressing operation on the right operation portion 45R, even if the pressing operation is canceled thereafter, the right front rod 41R is, in the right opened state, maintained at the engagement released position at the time of the pressing operation in the lid 20. In this case, even if the pressing operation on the right operation portion 45R is canceled, the right projecting portion 51 of the right front rod 41R is kept being located in the inclined portion 57Rb of the right engagement hole portion 57R of the erroneous operation prevention bar 54.

The left stopper 70L has a rotation restricting portion 74L. When the lid 20 is in a left opened state, the rotation restricting portion 74L allows the left stopper 70L to rotate in the clockwise direction ω+ by an energizing force of the spring member 80, and when the lid 20 is in a left closed state, the rotation restricting portion 74L restricts the left stopper 70L from rotating in the clockwise direction ω+, against an energizing force of the spring member 80. The rotation restricting portion 74L is contactable with the upper surface of the front base portion 14 of the box body 10, and protrudes frontward from the body portion 71L.

Figure 14:
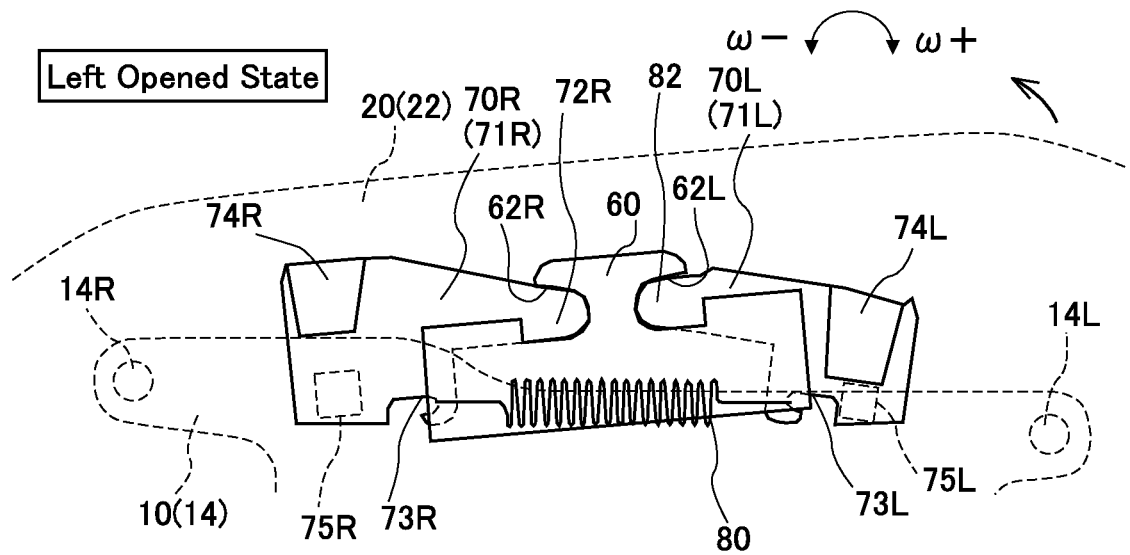
FIG. 14 illustrates the operation state of the erroneous operation preventing device of the double opening console box according to the embodiment, when the lid is in a left opened state.

As shown in FIG. 13, the rotation restricting portion 74L comes into contact with the upper surface of the front base portion 14 when the lid 20 is not in a left opened state, i.e., is in a left closed state. In a state in which the rotation restricting portion 74L is in contact with the upper surface of the front base portion 14, the left stopper 70L is restricted from rotating in the clockwise direction ω+ by an energizing force of the spring member 80, i.e., being pushed down relative to the lower lid member 21. On the other hand, as shown in FIG. 14, when the lid 20 is in a left opened state, the rotation restricting portion 74L is separated from the upper surface of the front base portion 14. When the rotation restricting portion 74L is separated from the upper surface of the front base portion 14, the left stopper 70L rotates in the clockwise direction ω+ by an energizing force of the spring member 80 so as to be pushed down relative to the lower lid member 21.

The left stopper 70L has a displacement restricting portion 75L. When the lid 20 is in a left closed state, the displacement restricting portion 75L does not come into contact with a restriction portion 41Lc provided at a front part of the left front rod 41L. When the lid 20 is in a left opened state, the displacement restricting portion 75L comes into contact with the restriction portion 41Lc of the left front rod 41L. The displacement restricting portion 75L is provided integrally with the body portion 71L and is formed to have a surface portion facing rearward. When the displacement restricting portion 75L does not come into contact with the restriction portion 41Lc of the left front rod 41L, frontward movement of the left front rod 41L by an energizing force of the left rod energizing member 44L is allowed, so that engagement between the left front rod 41L and the engagement hole 14L is allowed. On the other hand, when the displacement restricting portion 75L comes into contact with the restriction portion 41Lc of the left front rod 41L, frontward movement of the left front rod 41L by an energizing force of the left rod energizing member 44L is restricted, so that the left front rod 41L and the engagement hole 14L are restricted from being engaged with each other, against an energizing force of the left rod energizing member 44L.

When the lid 20 is not in a left opened state, i.e., is in a left closed state, as shown in FIG. 15, the left stopper 70L is not pushed down relative to the lower lid member 21, due to rotation restriction by the rotation restricting portion 74L. Thus, the displacement restricting portion 75L is not at a contactable position with respect to the restriction portion 41Lc of the left front rod 41L. At this time, the left front rod 41L is energized frontward by an energizing force of the left rod energizing member 44L, without coming into contact with the displacement restricting portion 75L, so that engagement between the left front rod 41L and the engagement hole 14L is allowed. Thus, when the lid 20 is in a left closed state, a left locked state is established.

On the other hand, when the left operation portion 45L is pressed rightward from the closed state of the lid 20, first, as shown in FIG. 16, the left front rod 41L moves rearward and the restriction portion 41Lc thereof also moves rearward. Then, when engagement between the box body 10, and the left front rod 41L and the left rear rod 42L, is released so that the left lock device 40L comes into a left lock released state (i.e., left opened state), as shown in FIG. 17, rotation restriction by the rotation restricting portion 74L is released and the left stopper 70L is pushed down relative to the lower lid member 21 by an energizing force of the spring member 80, so that the displacement restricting portion 75L comes to a contactable position with respect to the restriction portion 41Lc of the left front rod 41L. At this time, even when the left front rod 41L is energized frontward by an energizing force of the left rod energizing member 44L, the left front rod 41L comes into contact with the displacement restricting portion 75L and thus is not allowed to move any more, whereby the left front rod 41L and the engagement hole 14L are restricted from being engaged with each other.

Therefore, once the lid 20 comes into a left opened state by a rightward pressing operation on the left operation portion 45L, even if the pressing operation is canceled thereafter, the left front rod 41L is, in the left opened state, maintained at the engagement released position at the time of the pressing operation in the lid 20. In this case, even if the pressing operation on the left operation portion 45L is canceled, the left projecting portion 52 of the left front rod 41L is kept being located in the inclined portion 57Lb of the left engagement hole portion 57L of the erroneous operation prevention bar 54.

Next, operation of the double opening console box 1 will be described.

In the double opening console box 1, when the lid 20 is in a closed state, the right front rod 41R and the left front rod 41L are engaged with the front base portion 14 of the box body 10, the right rear rod 42R is engaged with the arm member 32, and the left rear rod 42L is engaged with the rear base portion 13 of the box body 10 through the arm member 32.

When the button portion 45Ra of the right operation portion 45R is pressed leftward in the closed state of the lid 20 described above, the press slope surface of the rod left end of the button portion 45Ra comes into contact with the operation engagement portion 41Rb of the right front rod 41R, so that the right front rod 41R moves rearward relative to the lid 20. When the right front rod 41R moves rearward, the right synchronization member 43R rotates leftward around the protruding portion 23R of the lid 20, whereby the right rear rod 42R moves frontward relative to the lid 20.

When the right front rod 41R moves rearward to reach release of engagement with the front base portion 14 of the box body 10 and the right rear rod 42R moves frontward to reach release of engagement with the arm member 32, the right lock device 40R comes into a right lock released state, in a state in which the left front rod 41L is engaged with the front base portion 14 of the box body 10 and the left rear rod 42L is engaged with the rear base portion 13 of the box body 10 (i.e., a left locked state of the left lock device 40L). In this case, while the left closed state of the lid 20 is maintained, maintenance of the right closed state of the lid 20 is released.

Desirably, the right lock device 40R is configured such that engagement/disengagement between the right front rod 41R and the engagement hole 14R of the front base portion 14 of the box body 10 and engagement/disengagement between the right rear rod 42R and the engagement hole 32K of the arm member 32, are performed substantially at the same timing.

When maintenance of the right closed state of the lid 20 is released while the left closed state thereof is maintained, the arm member 32 does not swing relative to the rear base portion 13 of the box body 10, whereas the lid 20 swings relative to the arm member 32 by an energizing force of the arm spring 35L of the left pivotal support portion 33L. Therefore, when the button portion 45Ra of the right operation portion 45R is pressed leftward, the lid 20 rotates around the left rotation shaft relative to the arm member 32, in other words, relative to the box body 10, in a state in which the arm member 32 is integrated with the box body 10. Thus, the lid 20 comes into a right opened state in which the right side thereof is opened toward the opened position.

Figure 18:
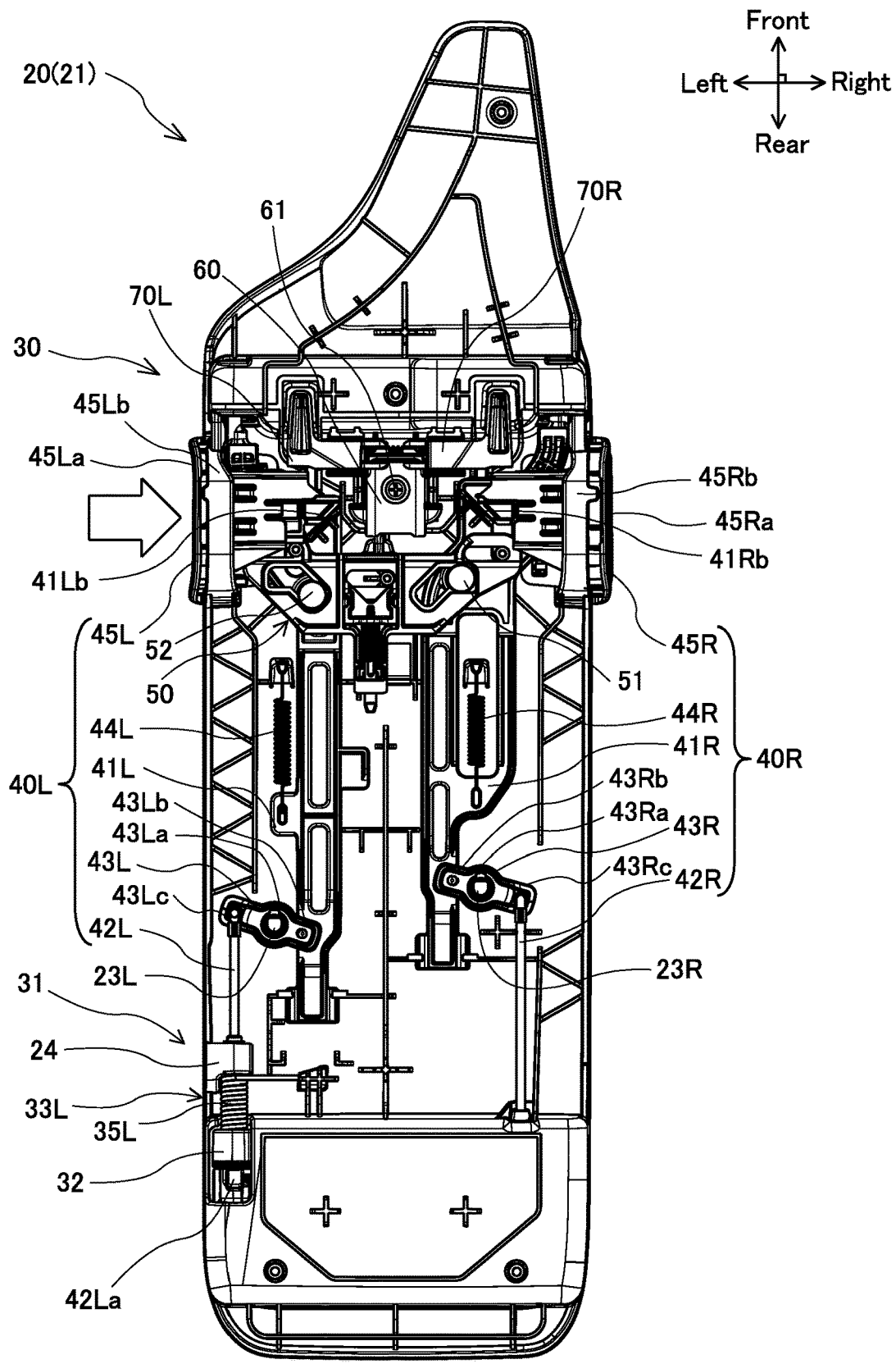
FIG. 18 shows the structure of the opening/closing mechanism of the double opening console box according to the embodiment, when the lid is in a left closed state.

As shown in FIG. 18, when the button portion 45La of the left operation portion 45L is pressed rightward in the closed state of the lid 20 described above, the press slope surface of the rod right end of the button portion 45La comes into contact with the operation engagement portion 41Lb of the left front rod 41L, so that the left front rod 41L moves rearward relative to the lid 20. When the left front rod 41L moves rearward, the left synchronization member 43L rotates rightward around the protruding portion 23L of the lid 20, whereby the left rear rod 42L moves frontward relative to the lid 20.

When the left front rod 41L moves rearward to reach release of engagement with the front base portion 14 of the box body 10 and the left rear rod 42L moves frontward to reach release of engagement with the rear base portion 13 of the box body 10, the left lock device 40L comes into a left lock released state, in a state in which the right front rod 41R is engaged with the front base portion 14 of the box body 10 and the right rear rod 42R is engaged with the arm member 32 (i.e., a right locked state of the right lock device 40R). In this case, while the right closed state of the lid 20 is maintained, maintenance of the left closed state of the lid 20 is released.

Desirably, the left lock device 40L is configured such that engagement/disengagement between the left front rod 41L and the engagement hole 14L of the front base portion 14 of the box body 10, and engagement/disengagement between the left rear rod 42L and the engagement hole 13L of the rear base portion 13 of the box body 10, are performed substantially at the same timing.

When maintenance of the left closed state of the lid 20 is released while the right closed state thereof is maintained, the lid 20 does not swing relative to the arm member 32, whereas the arm member 32 swings relative to the rear base portion 13 of the box body 10 by an energizing force of the arm spring 35R of the right pivotal support portion 33R. Therefore, when the button portion 45La of the left operation portion 45L is pressed rightward, the lid 20 rotates around the right rotation shaft relative to the box body 10 in a state in which the lid 20 is integrated with the arm member 32. Thus, the lid 20 comes into a left opened state in which the left side thereof is opened toward the opened position.

As described above, in the double opening console box 1, from a closed state in which the opening 11 of the box body 10 is closed, the lid 20 is allowed to come into a right opened state around the left rotation shaft and is allowed to come into a left opened state around the right rotation shaft. Therefore, the lid 20 is allowed to be opened relative to the box body 10 around one rotation shaft selected from the left rotation shaft and the right rotation shaft.

When a pressing operation is performed in a direction in which the lid 20 is returned around the left rotation shaft from the right opened state, the rotation restricting portion 74R of the right stopper 70R comes into contact with the upper surface of the front base portion 14 at a certain timing by the time when the lid 20 comes into a closed state, and thereafter, the right stopper 70R is rotated in the clockwise direction ω+ relative to the lid 20 against an energizing force of the spring member 80, so as to be pushed up relative to the lower lid member 21. In this case, contact between the right front rod 41R and the displacement restricting portion 75R of the right stopper 70R is released, and the right front rod 41R moves frontward by an energizing force of the right rod energizing member 44R. Thus, the right front rod 41R and the engagement hole 14R are engaged with each other, so that the right lock device 40R comes into a locked state.

On the other hand, when a pressing operation is performed in a direction in which the lid 20 is returned around the right rotation shaft from a left opened state, the rotation restricting portion 74L of the left stopper 70L comes into contact with the upper surface of the front base portion 14 at a certain timing by the time when the lid 20 comes into a closed state, and thereafter, the left stopper 70L is rotated in the counterclockwise direction ω− relative to the lid 20 against an energizing force of the spring member 80, so as to be pushed up relative to the lower lid member 21. In this case, contact between the left front rod 41L and the displacement restricting portion 75L of the left stopper 70L is released, and the left front rod 41L moves frontward by an energizing force of the left rod energizing member 44L. Thus, the left front rod 41L and the engagement hole 14L are engaged with each other, so that the left lock device 40L comes into a locked state.

As described above, in the case where the lid 20 comes into a right opened state or a left opened state and then a pressing operation is performed in a direction in which the lid 20 is returned around the rotation shaft, the lid 20 is allowed to be closed by being rotated in a direction in which the opening 11 of the box body 10 is closed. Therefore, the lid 20 in a right opened state or a left opened state is allowed to be closed relative to the box body 10 around the left rotation shaft or the right rotation shaft.

In the double opening console box 1, as described above, the opening/closing mechanism 30 has the erroneous operation preventing device 50 that prevents an opening operation on the right operation portion 45R and an opening operation on the left operation portion 45L from being performed simultaneously. The erroneous operation preventing device 50 has the right projecting portion 51 provided to the right front rod 41R, the left projecting portion 52 provided to the left front rod 41L, and the erroneous operation prevention bar 54 supported so as to be movable in the left-right direction relative to the lower lid member 21 of the lid 20. The erroneous operation prevention bar 54 has, at a right part, the right engagement hole portion 57R with which the right projecting portion 51 is engaged so as to be relatively movable, the right engagement hole portion 57R being formed in an elongated shape, and the erroneous operation prevention bar 54 has, at a left part, the left engagement hole portion 57L with which the left projecting portion 52 is engaged so as to be relatively movable, the left engagement hole portion 57L being formed in an elongated shape. The right engagement hole portion 57R and the left engagement hole portion 57L respectively have the straight portions 57Ra, 57La extending in the left-right direction, and the inclined portions 57Rb, 57Lb contiguous to the straight portions 57Ra, 57La and extending in directions inclined relative to the straight portions 57Ra, 57La.

The positional relationship between the right engagement hole portion 57R and the right projecting portion 51, and the positional relationship between the left engagement hole portion 57L and the left projecting portion 52, are set such that the projecting portions 51, 52 are located near the boundaries between the straight portions 57Ra, 57La and the inclined portions 57Rb, 57Lb when the lid 20 is in a closed state. When an opening operation is performed on the right operation portion 45R, the erroneous operation prevention bar 54 moves rightward relative to the lid 20, so that the left projecting portion 52 of the left front rod 41L moves from the vicinity of the boundary in the left engagement hole portion 57L to the deeper side in the straight portion 57La (i.e., a side separated from the inclined portion 57Lb), and the right projecting portion 51 of the right front rod 41R moves from the vicinity of the boundary in the right engagement hole portion 57R to the inclined portion 57Rb. When an opening operation is performed on the left operation portion 45L, the erroneous operation prevention bar 54 moves leftward relative to the lid 20, so that the right projecting portion 51 of the right front rod 41R moves from the vicinity of the boundary in the right engagement hole portion 57R to the deeper side in the straight portion 57Ra (i.e., a side separated from the inclined portion 57Rb), and the left projecting portion 52 of the left front rod 41L moves from the vicinity of the boundary in the left engagement hole portion 57L to the inclined portion 57Lb.

In such a structure, when the right lock device 40R comes into a lock released state by an opening operation on the right operation portion 45R and thus the lid 20 comes into a right opened state, the left projecting portion 52 of the left front rod 41L is located in the straight portion 57La of the left engagement hole portion 57L of the erroneous operation prevention bar 54, whereby front-rear-direction movements of the left front rod 41L and the left rear rod 42L synchronous with the left front rod 41L are restricted. Thus, an opening operation on the left operation portion 45L is restricted. When the left lock device 40L comes into a lock released state by an opening operation on the left operation portion 45L and thus the lid 20 comes into a left opened state, the right projecting portion 51 of the right front rod 41R is located in the straight portion 57Ra of the right engagement hole portion 57R of the erroneous operation prevention bar 54, whereby front-rear-direction movements of the right front rod 41R and the right rear rod 42R synchronous with the right front rod 41R are restricted. Thus, an opening operation on the right operation portion 45R is restricted.

Further, in the double opening console box 1, the erroneous operation preventing device 50 has the right stopper 70R that restricts the right front rod 41R from moving frontward in a right opened state of the lid 20 so as to restrict the right front rod 41R from being engaged with the engagement hole 14R of the front base portion 14 of the box body 10, and the left stopper 70L that restricts the left front rod 41L from moving frontward in a left opened state of the lid 20 so as to restrict the left front rod 41L from being engaged with the engagement hole 14L of the front base portion 14 of the box body 10.

In such a structure, once the lid 20 comes into a right opened state, frontward movement of the right front rod 41R is restricted by the right stopper 70R, even after a pressing operation on the button portion 45Ra of the right operation portion 45R is canceled. In this case, the button portion 45Ra of the right operation portion 45R is restricted from being returned to the original position from the pressed position, and engagement between the right front rod 41R and the engagement hole 14R and engagement between the right rear rod 42R and the engagement hole 32K by an energizing force of the right rod energizing member 44R, are restricted from being made. On the other hand, once the lid 20 comes into a left opened state, frontward movement of the left front rod 41L is restricted by the left stopper 70L, even after a pressing operation on the button portion 45La of the left operation portion 45L is canceled. In this case, the button portion 45La of the left operation portion 45L is restricted from being returned to the original position from the pressed position, and engagement between the left front rod 41L and the engagement hole 14L and engagement between the left rear rod 42L and the engagement hole 13L by an energizing force of the left rod energizing member 44L, are restricted from being made.

Therefore, when the button portion 45Ra of the right operation portion 45R is pressed so that the erroneous operation prevention bar 54 moves rightward relative to the lid 20 and the lid 20 comes into a right opened state, even after the pressing operation on the button portion 45Ra of the right operation portion 45R is canceled, the left projecting portion 52 of the left front rod 41L is located in the straight portion 57La of the left engagement hole portion 57L of the erroneous operation prevention bar 54, and the right front rod 41R is restricted by the right stopper 70R from moving frontward relative to the erroneous operation prevention bar 54, in other words, relative to the lid 20, and at the same time, the right rear rod 42R is restricted from moving rearward relative to the lid 20.

Therefore, in the right opened state of the lid 20, even after the pressing operation on the button portion 45Ra of the right operation portion 45R is canceled, the state in which the erroneous operation prevention bar 54 has moved rightward relative to the lid 20 is maintained, and thus the state in which the position of the left projecting portion 52 is retained in the straight portion 57La of the left engagement hole portion 57L is continued. In such a condition, even if an operator attempts to move the left front rod 41L rearward relative to the erroneous operation prevention bar 54, in other words, relative to the lid 20 by a pressing operation on the button portion 45La of the left operation portion 45L, the left projecting portion 52 is not allowed to further move rearward relative to the straight portion 57La of the left engagement hole portion 57L. Therefore, a pressing operation on the button portion 45La of the left operation portion 45L is restricted, and the left front rod 41L and the left rear rod 42L are prevented from being allowed to move in the front-rear direction.

When the button portion 45La of the left operation portion 45L is pressed so that the erroneous operation prevention bar 54 moves leftward relative to the lid 20 and the lid 20 comes into a left opened state, even after the pressing operation on the button portion 45La of the left operation portion 45L is canceled, the right projecting portion 51 of the right front rod 41R is located in the straight portion 57Ra of the right engagement hole portion 57R of the erroneous operation prevention bar 54, and the left front rod 41L is restricted by the left stopper 70L from moving frontward relative to the erroneous operation prevention bar 54, in other words, relative to the lid 20, and at the same time, the left rear rod 42L is restricted from moving rearward relative to the lid 20.

Therefore, in the left opened state of the lid 20, even after the pressing operation on the button portion 45La of the left operation portion 45L is canceled, the state in which the erroneous operation prevention bar 54 has moved leftward relative to the lid 20 is maintained, and thus the state in which the position of the right projecting portion 51 is retained in the straight portion 57Ra of the right engagement hole portion 57R is continued. In such a condition, even if an operator attempts to move the right front rod 41R rearward relative to the erroneous operation prevention bar 54, in other words, relative to the lid 20 by a pressing operation on the button portion 45Ra of the right operation portion 45R, the right projecting portion 51 is not allowed to further move rearward relative to the straight portion 57Ra of the right engagement hole portion 57R. Therefore, a pressing operation on the button portion 45Ra of the right operation portion 45R is restricted, and the right front rod 41R and the right rear rod 42R are prevented from being allowed to move in the front-rear direction.

That is, in the right opened state of the lid 20, front-rear-direction movements of the left front rod 41L and the left rear rod 42L by a pressing operation on the left operation portion 45L are restricted and the left lock device 40L is maintained in a left locked state. In the left opened state of the lid 20, front-rear-direction movements of the right front rod 41R and the right rear rod 42R by a pressing operation on the right operation portion 45R are restricted and the right lock device 40R is maintained in a right locked state. Therefore, an opening operation on the right operation portion 45R and an opening operation on the left operation portion 45L are prevented from being performed simultaneously, whereby the lid 20 is prevented from coming into both a left opened state and a right opened state.

Further, in the double opening console box 1, the erroneous operation preventing device 50 has the centering component 55 having the recess groove 55a formed in a V shape symmetric between left and right at a front end thereof, and the spring member 56 that generates an energizing force for energizing the centering component 55 frontward relative to the erroneous operation prevention bar 54. With this structure, when the lid 20 is in a closed state, the center projecting portion 53 of the lower lid member 21 is located at the rear end bottom of the recess groove 55a of the centering component 55, and when an opening operation is performed on the right operation portion 45R or the left operation portion 45L, a reaction force against the opening operation is given by using the spring member 56.

The centering component 55 and the spring member 56 are stored in the centering accommodating portion 59 of the erroneous operation prevention bar 54. Specifically, the centering accommodating portion 59 stores the spring member 56 such that the rear end portion thereof is supported, and stores the centering component 55 supporting the front end portion of the spring member 56, such that front-rear-direction movement of the centering component 55 relative to the erroneous operation prevention bar 54 is allowed and left-right-direction movement thereof relative to the erroneous operation prevention bar 54 is prohibited. With this structure, the centering component 55 and the spring member 56 are integrally stored in the erroneous operation prevention bar 54 while their functions are maintained. Therefore, regarding component arrangement, space saving or efficient space usage is achieved, whereby the erroneous operation preventing device 50 is made compact.

The centering component 55 and the spring member 56 are attached to the erroneous operation prevention bar 54 so as to be unitized, and then the obtained unit is incorporated into the lower lid member 21 of the lid 20. Therefore, the work for attaching the erroneous operation prevention bar 54 to the lower lid member 21 is facilitated and the number of the attachment steps is decreased, whereby assemblability is improved. In addition, a structure for attaching the centering component 55 and the spring member 56 does not need to be provided to the lower lid member 21, and therefore the degree of freedom for using the attachment space in the lower lid member 21 is increased.

In the double opening console box 1, the right lock device 40R has the right synchronization member 43R that moves the right front rod 41R and the right rear rod 42R in synchronization with each other in the front-rear direction, and the left lock device 40L has the left synchronization member 43L that moves the left front rod 41L and the left rear rod 42L in synchronization with each other in the front-rear direction. The right synchronization member 43R and the left synchronization member 43L are each rotatably supported by the lower lid member 21. The cylindrical portion 43Ra of the right synchronization member 43R is inserted and fitted to the protruding portion 23R of the lower lid member 21, and an end of the cylindrical portion 43Ra is engaged with the fixation nail 23Ra of the protruding portion 23R. The cylindrical portion 43La of the left synchronization member 43L is inserted and fitted to the protruding portion 23L of the lower lid member 21, and an end of the cylindrical portion 43La is engaged with the fixation nail 23La of the protruding portion 23L.

With this configuration, use of additional components such as a screw is not needed for rotatably supporting the right synchronization member 43R and the left synchronization member 43L in the lower lid member 21. Therefore, owing to decrease in the number of components, the component cost is reduced, and the number of steps for attaching such additional components is decreased. In order to rotatably support the right synchronization member 43R and the left synchronization member 43L in the lower lid member 21, attachment work in which the right synchronization member 43R and the left synchronization member 43L are fitted to the protruding portions 23R, 23L of the lower lid member 21 so as to be engaged with the fixation nails 23Ra, 23La, is merely required. Thus, the attachment work is facilitated.

In the double opening console box 1, the left rear rod 42L of the left lock device 40L of the opening/closing mechanism 30 is supported by being inserted movably in the front-rear direction into the through hole 24a of the retention portion 24 integrally provided to the lower lid member 21 of the lid 20. With this structure, usage of additional support component or screw is not needed for keeping constant the height position where the left rear rod 42L extends in the front-rear direction so as to be separated from the upper surface of the lower lid member 21. Therefore, owing to decrease in the number of components, the component cost is reduced, and the number of steps for attaching such additional components is decreased. In order to support the left rear rod 42L movably in the front-rear direction with respect to the lower lid member 21, attachment work in which the left rear rod 42L is inserted into the through hole 24a of the retention portion 24 of the lower lid member 21, is merely required. Thus, the attachment work is facilitated.

In the double opening console box 1, once the lid 20 comes into a right opened state by a pressing operation on the button portion 45Ra of the right operation portion 45R, until the lid 20 next comes into a right closed state, the button portion 45Ra is restricted by the right stopper 70R from being returned to the original position from the pressed position, even after the pressing operation on the button portion 45Ra is canceled. In this structure, while the lid 20 is in a right opened state, the button portion 45Ra of the right operation portion 45R is continuously maintained in a state of being pressed at the pressed position. Then, when restriction of frontward/rearward movements of the right front rod 41R and the right rear rod 42R by the right stopper 70R is released so that the lid 20 comes into a right closed state, the button portion 45Ra is returned to the original position from the pressed position. Therefore, whether or not the lid 20 is in a right opened state is confirmed by visually recognizing whether or not the button portion 45Ra of the right operation portion 45R is in a pressed state.

Similarly, once the button portion 45La of the left operation portion 45L is pressed so that the lid 20 comes into a left opened state, until the lid 20 next comes into a left closed state, the button portion 45La is restricted by the left stopper 70L from being returned to the original position from the pressed position, even after the pressing operation on the button portion 45La is canceled. In this structure, while the lid 20 is in a left opened state, the button portion 45La of the left operation portion 45L is continuously maintained in a state of being pressed at the pressed position. Then, when restriction of frontward/rearward movements of the left front rod 41L and the left rear rod 42L by the left stopper 70L is released so that the lid 20 comes into a left closed state, the button portion 45La is returned to the original position from the pressed position. Therefore, whether or not the lid 20 is in a left opened state is confirmed by visually recognizing whether or not the button portion 45La of the left operation portion 45L is in a pressed state.

As described above, in accordance with opening/closing of the lid 20, the button portion 45Ra of the right operation portion 45R moves between the pressed position and the original position, and the button portion 45La of the left operation portion 45L moves between the pressed position and the original position. Thus, additional components such as a spring for returning each button portion 45Ra, 45La to the original position after the pressing operation is canceled is not needed. Therefore, owing to decrease in the number of components, the component cost is reduced, and the number of steps for attaching such additional components is decreased.

In the double opening console box 1, the opening/closing mechanism 30 has the right front rod 41R to be inserted into the engagement hole 14R of the front base portion 14 of the box body 10 so as to be engageable and disengageable with and from the engagement hole 14R, the right rear rod 42R to be inserted into the engagement hole 32K of the arm member 32 so as to be engageable and disengageable with and from the engagement hole 32K, the left front rod 41L to be inserted into the engagement hole 14L of the front base portion 14 of the box body 10 so as to be engageable and disengageable with and from the engagement hole 14L, and the left rear rod 42L to be inserted into the engagement hole 13L of the rear base portion 13 of the box body 10 so as to be engageable and disengageable with and from the engagement hole 13L. In this structure, in shifting of the lid 20 from a right opened state to a right closed state, during a period from when restriction of frontward/rearward movements of the right front rod 41R and the right rear rod 42R by the right stopper 70R is released to when both rods 41R, 42R are engaged and inserted into the engagement holes 14R, 32K, in some cases, the front end portion of the right front rod 41R comes into contact with the upper surface of a part located upward of the engagement hole 14R in the front base portion 14 of the box body 10, and the rear end portion of the right rear rod 42R comes into contact with the upper surface of a part located upward of the engagement hole 32K in the arm member 32. Similarly, in shifting of the lid 20 from a left opened state to a left closed state, during a period from when restriction of frontward/rearward movements of the left front rod 41L and the left rear rod 42L by the left stopper 70L is released to when both rods 41L, 42L are engaged and inserted into the engagement hole 14L, 13L, in some cases, the front end portion of the left front rod 41L comes into contact with the upper surface of a part located upward of the engagement hole 14L in the front base portion 14 of the box body 10, and the rear end portion of the left rear rod 42L comes into contact with the upper surface of a part located upward of the engagement hole 13L in the rear base portion 13 of the box body 10.

In the case where the lid 20 is formed in a shape long in the front-rear direction, some operators who open or close the lid 20 generally press a position shifted toward one side in the front-rear direction, when closing the opened lid 20. When a position shifted toward, for example, the front side in the lid 20 is pressed down, the lid 20 is closed in a twisted state in which the front portion thereof is lower than the rear portion thereof. Assuming a structure in which the upper surface of a part located upward of the engagement hole 14R, 14L in the front base portion 14 of the box body 10 and the upper surface of a part located upward of the engagement hole 32K in the arm member 32 or the engagement hole 13L in the rear base portion 13, are at the same height position, when the lid 20 is closed in the aforementioned twisted state, one-side catching in which the right front rod 41R or the left front rod 41L comes into contact with the above upward part at an earlier timing than the right rear rod 42R or the left rear rod 42L, occurs.

Figure 19:
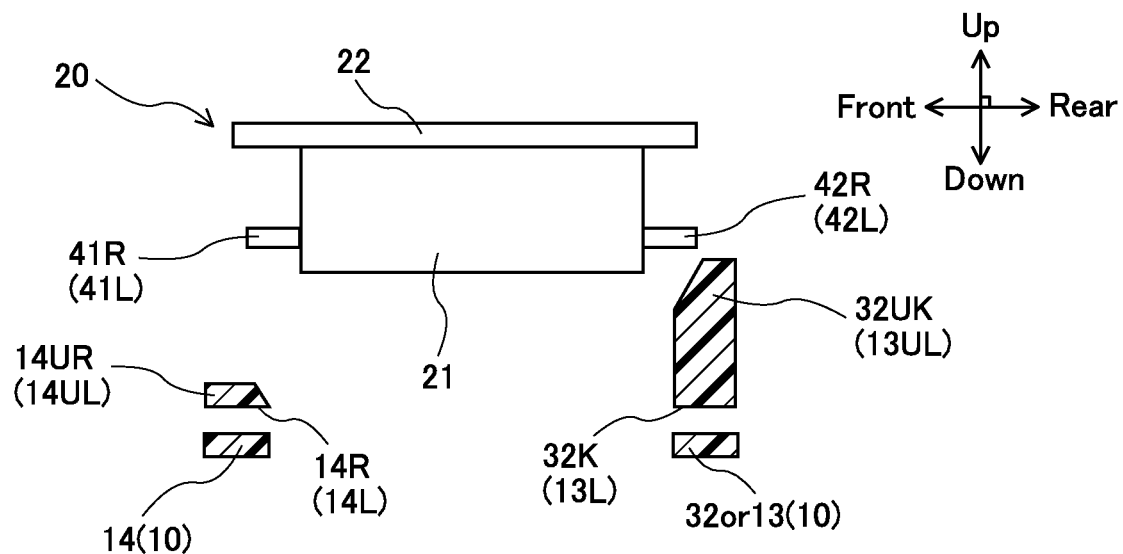
FIG. 19 shows the positional relationship between a box body and the lid in the opening/closing mechanism of the double opening console box according to the embodiment, when the lid is in an opened state.
Figure 20:
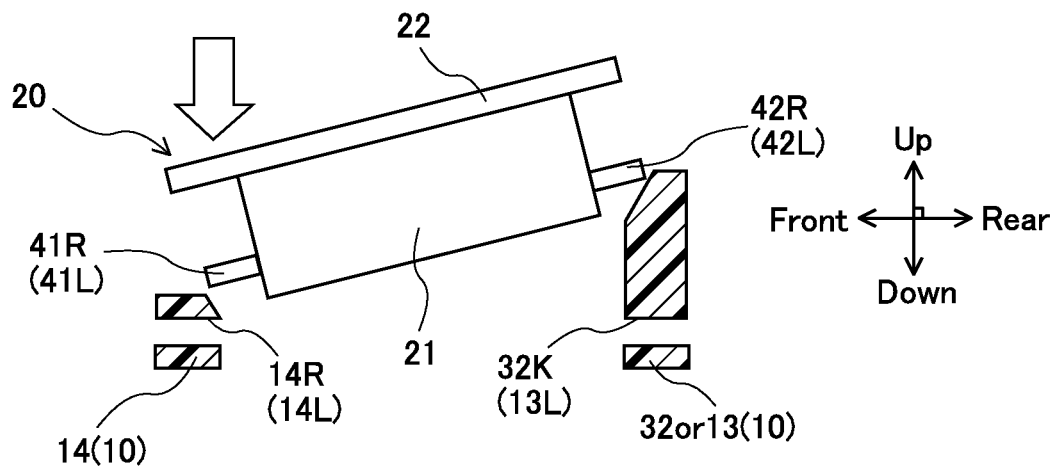
FIG. 20 shows the positional relationship between the box body and the lid in the opening/closing mechanism of the double opening console box according to the embodiment, when a closing operation is performed on the lid.

In contrast, in the double opening console box 1, as shown in FIG. 19 and FIG. 20, a part 14UR, 14UL located upward of the engagement hole 14R, 14L in the front base portion 14 of the box body 10, and a part 32UK, 13UL located upward of the engagement hole 32K in the arm member 32 or the engagement hole 13L in the rear base portion 13, each have a contact corner portion formed in a taper shape, and the upper surface of the front-side part 14UR, 14UL is formed to be lower than the upper surface of the rear-side part 32UK, 13UL. A difference in height position between the upper surface of the front-side part 14UR, 14UL and the upper surface of the rear-side part 32UK, 13UL is set to a height difference between the front part and the rear part of the lid 20 caused by twisting when the lid 20 is pressed.

With this structure, when a position shifted frontward in the lid 20 is pressed down so that the lid 20 is closed in the aforementioned twisted state, the timing at which the right front rod 41R or the left front rod 41L comes into contact with the part 14UR, 14UL of the front base portion 14, and the timing at which the right rear rod 42R or the left rear rod 42L comes into contact with the part 32UK, 13UL of the arm member 32 or the rear base portion 13, are inhibited from being different from each other, whereby the aforementioned one-side catching is prevented. In addition, since the contact corner portions of the contact parts 14UR, 14UL, 32UK, 13UL of the box body 10 and the arm member 32 are formed in taper shapes, the rods 41R, 41L, 42R, 42L are easily moved to the inside of the lid 20 against an energizing force of the right rod energizing member 44R or the left rod energizing member 44L, as compared to a structure in which the contact parts are not formed in taper shapes. Therefore, the rods 41R, 41L, 42R, 42L are guided from contact with the contact parts 14UR, 14UL, 32UK, 13UL to insertion into the engagement holes 14R, 14L, 32K, 13L, whereby insertion of the rods 41R, 41L, 42R, 42L into the engagement holes 14R, 14L, 32K, 13L is facilitated.

Figure 22:
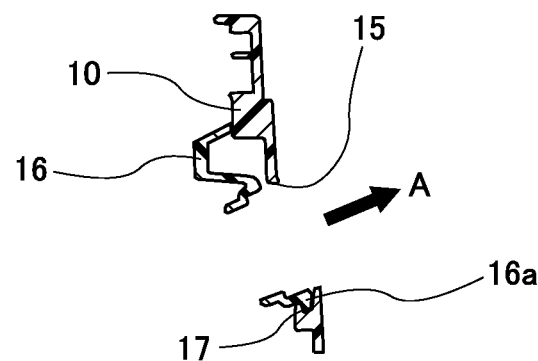
FIG. 22 is a view of the double opening console box shown in FIG. 21, taken along plane XXII, as seen in the direction of an arrow.
Figure 23:
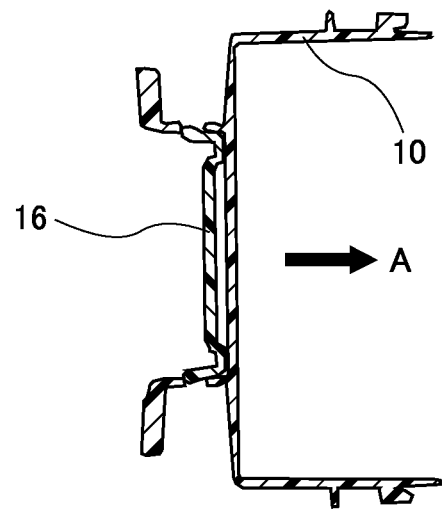
FIG. 23 is a view of the double opening console box shown in FIG. 21, taken along plane XXIII, as seen in the direction of an arrow.
Figure 24:
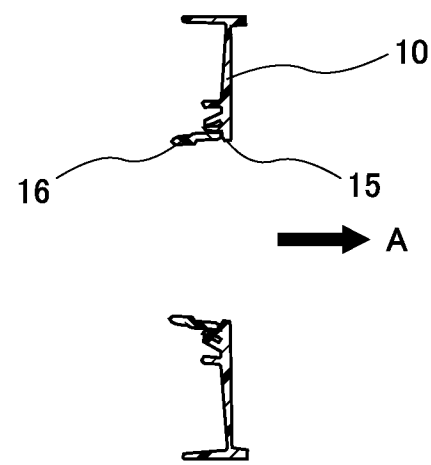
FIG. 24 is a view of the double opening console box shown in FIG. 21, taken along plane XXIV, as seen in the direction of an arrow.

Further, in the double opening console box 1, the bezel 16 is attached to the box body 10 from the outer side. In addition, the socket is extracted/inserted on the inner side of the box body 10. In this structure, as shown in FIG. 22, FIG. 23, and FIG. 24, when the socket is extracted in an arrow direction A from the box body 10 to the inner side, the bezel 16 is subjected to a force in a direction opposite to a direction in which the nail portion 16a is detached from the engagement hole portion 17 of the box body 10. Therefore, in detaching the socket, a force due to the detachment is prevented from acting on the bezel 16 in such a direction as to facilitate detachment of the bezel 16, whereby the bezel 16 is prevented from being detached from the box body 10.

In the above embodiment, the box body 10 including the arm member 32 corresponds to "box body" described in the claims, the right front rod 41R and the right rear rod 42R correspond to "right rod" described in the claims, the left front rod 41L and the left rear rod 42L correspond to "left rod" described in the claims, the engagement holes 14R, 14L in the front base portion 14 of the box body 10 correspond to "fixed-side front engagement portion" described in the claims, the right front rod 41R and the left front rod 41L correspond to "movable-side front engagement portion" described in the claims, the engagement hole 32K of the arm member 32 and the engagement hole 13L of the rear base portion 13 of the box body 10 correspond to "fixed-side rear engagement portion" described in the claims, the right rear rod 42R and the left rear rod 42L correspond to "movable-side rear engagement portion" described in the claims, and the right synchronization member 43R and the left synchronization member 43L correspond to "synchronization member" described in the claims.

In the above embodiment, the right operation portion 45R and the left operation portion 45L are located at a front part of the lower lid member 21 of the lid 20, the left end of the button portion 45Ra of the right operation portion 45R and the right end of the button portion 45La of the left operation portion 45L have press slope surfaces formed by obliquely cutting rear sides thereof, and the operation engagement portion 41Rb of the right front rod 41R and the operation engagement portion 41Lb of the left front rod 41L have inclined surfaces facing the obliquely front side so as to correspond to the press slope surfaces of the button portions 45Ra, 45La, respectively. However, the present invention is not limited thereto. The right operation portion 45R and the left operation portion 45L may be located at a rear part of the lower lid member 21 of the lid 20, the left end of the button portion 45Ra of the right operation portion 45R and the right end of the button portion 45La of the left operation portion 45L may have press slope surfaces formed by obliquely cutting front sides thereof, and the operation engagement portion 41Rb of the right front rod 41R and the operation engagement portion 41Lb of the left front rod 41L may have inclined surfaces facing the obliquely rear side so as to correspond to the press slope surfaces of the button portions 45Ra, 45La, respectively. In this modification, the right engagement hole portion 57R and the left engagement hole portion 57L of the erroneous operation prevention bar 54 are formed such that the inclined portions 57Rb, 57Lb extend in directions inclined obliquely frontward relative to the straight portions 57Ra, 57La.

In the above embodiment, when the button portion 45Ra of the right operation portion 45R is pressed leftward, the erroneous operation prevention bar 54 is moved rightward relative to the lid 20, and when the button portion 45La of the left operation portion 45L is pressed rightward, the erroneous operation prevention bar 54 moves leftward relative to the lid 20. That is, the right engagement hole portion 57R and the left engagement hole portion 57L of the erroneous operation prevention bar 54 are formed such that the inclined portions 57Rb, 57Lb are located on the left-right center side of the lid 20 relative to the straight portions 57Ra, 57La. However, the present invention is not limited thereto. When the button portion 45Ra of the right operation portion 45R is pressed leftward, the erroneous operation prevention bar 54 may move leftward relative to the lid 20, and when the button portion 45La of the left operation portion 45L is pressed rightward, the erroneous operation prevention bar 54 may move rightward relative to the lid 20. That is, the right engagement hole portion 57R and the left engagement hole portion 57L of the erroneous operation prevention bar 54 may be formed such that the inclined portions 57Rb, 57Lb are located on the right and left end sides of the lid 20 relative to the straight portions 57Ra, 57La.

The present invention is not limited to the embodiment described above, and various changes may be made without departing from the gist of the present invention.

This application claims priority on Japanese Patent Application No. 2018-217775 filed in Japan on Nov. 20, 2018, the entire contents of which are incorporated herein by reference.

The invention claimed is:

1. A double opening console box comprising:
a box body that has a storage portion having an opening;
a lid supported rotatably relative to the box body and configured to perform an opening/closing action between a closed state in which the opening is closed and an opened state in which the opening is opened; and
an opening/closing mechanism configured to cause the lid to perform an opening/closing action around one rotation shaft selected from a left rotation shaft extending in a front-rear direction along a left peripheral edge of the opening and a right rotation shaft extending in the front-rear direction along a right peripheral edge of the opening, wherein the opening/closing mechanism includes
a right operation portion attached to a body portion of the lid so as to allow an opening operation, the right operation portion being configured to cause the lid to perform an opening action around the left rotation shaft by the opening operation,
a left operation portion attached to the body portion of the lid so as to allow an opening operation, the left operation portion being configured to cause the lid to perform an opening action around the right rotation shaft by the opening operation, and
an erroneous operation preventing device configured to prevent the opening action of the lid by the opening operation on the right operation portion and the opening action of the lid by the opening operation on the left operation portion from being performed simultaneously, the erroneous operation preventing device includes
a right projecting portion provided to a right rod that moves rearward or frontward by the opening operation on the right operation portion,
a left projecting portion provided to a left rod that moves rearward or frontward by the opening operation on the left operation portion,
a center projecting portion provided at a left-right center of the body portion of the lid,
an erroneous operation prevention bar extending in a left-right direction and movable in the left-right direction relative to the body portion of the lid,
a centering component having a recess groove formed symmetrically between left and right at one end in the front-rear direction, and
a spring member interposed between the erroneous operation prevention bar and the centering component and configured to generate an energizing force for energizing the centering component in the front-rear direction relative to the erroneous operation prevention bar so that the center projecting portion is located at a front-rear-direction bottom of the recess groove when the lid is in a closed state, and the erroneous operation prevention bar includes
a right engagement hole portion with which the right projecting portion is engaged so as to be relatively movable, the right engagement hole portion being formed, at a right part, in such an elongated hole shape as to restrict the opening operation on the right operation portion and the opening operation on the left operation portion from being performed simultaneously,
a left engagement hole portion with which the left projecting portion is engaged so as to be relatively movable, the left engagement hole portion being formed, at a left part, in the elongated hole shape,
a center through hole portion into which the center projecting portion is inserted so as to be relatively movable, the center through hole portion being provided at a left-right center, and
a centering accommodating portion configured to store the spring member such that one end thereof is supported, and store the centering component supporting another end of the spring member, such that front-rear-direction movement of the centering component relative to the erroneous operation prevention bar is allowed and left-right-direction movement of the centering component relative to the erroneous operation prevention bar is prohibited.

2. The double opening console box according to claim 1, wherein
the right engagement hole portion and the left engagement hole portion each have a straight portion extending in the left-right direction, and an inclined portion contiguous to one end of the straight portion and extending in a direction inclined relative to the straight portion.

3. The double opening console box according to claim 2, wherein
the opening/closing mechanism includes a right lock device configured to lock both front-rear-direction ends of a right part of the lid at a closed position, and a left lock device configured to lock both front-rear-direction ends of a left part of the lid at a closed position,
the right lock device and the left lock device each include
a fixed-side front engagement portion provided at a front part of the box body,
a movable-side front engagement portion provided at a front part of the lid and movable so as to be engageable and disengageable with and from the fixed-side front engagement portion,
a fixed-side rear engagement portion provided at a rear part of the box body,
a movable-side rear engagement portion provided at a rear part of the lid and movable so as to be engageable and disengageable with and from the fixed-side rear engagement portion, and
a synchronization member located between the movable-side front engagement portion and the movable-side rear engagement portion in the lid, the synchronization member being configured to, through rotation, move the movable-side front engagement portion and the movable-side rear engagement portion in synchronization with each other, and
the synchronization member is rotatably supported by the lid such that the synchronization member is engaged with a fixation nail integrally provided to the lid.

4. The double opening console box according to claim 3, wherein
the movable-side front engagement portion is a rod extending in a straight shape in the front-rear direction, the rod having a front end portion engageable and disengageable with and from the fixed-side front engagement portion, and a rear end portion rotatably engaged with the synchronization member, and the movable-side front engagement portion moves rearward by contact with the right operation portion or the left operation portion when the opening operation is performed on the right operation portion or the left operation portion,
the movable-side rear engagement portion is a rod extending in a straight shape in the front-rear direction, the rod having a front end portion rotatably engaged with the synchronization member, and a rear end portion engageable and disengageable with and from the fixed-side rear engagement portion, and the movable-side rear engagement portion moves frontward in synchronization with rearward movement of the movable-side front engagement portion through rotation of the synchronization member, and the movable-side rear engagement portion is supported by being inserted movably in the front-rear direction into a through hole of a retention portion integrally provided to the lid.

5. The double opening console box according to claim 1, wherein
the opening/closing mechanism includes a right lock device configured to lock both front-rear-direction ends of a right part of the lid at a closed position, and a left lock device configured to lock both front-rear-direction ends of a left part of the lid at a closed position,
the right lock device and the left lock device each include
a fixed-side front engagement portion provided at a front part of the box body,
a movable-side front engagement portion provided at a front part of the lid and movable so as to be engageable and disengageable with and from the fixed-side front engagement portion,
a fixed-side rear engagement portion provided at a rear part of the box body,
a movable-side rear engagement portion provided at a rear part of the lid and movable so as to be engageable and disengageable with and from the fixed-side rear engagement portion, and
a synchronization member located between the movable-side front engagement portion and the movable-side rear engagement portion in the lid, the synchronization member being configured to, through rotation, move the movable-side front engagement portion and the movable-side rear engagement portion in synchronization with each other, and
the synchronization member is rotatably supported by the lid such that the synchronization member is engaged with a fixation nail integrally provided to the lid.

6. The double opening console box according to claim 5, wherein
the movable-side front engagement portion is a rod extending in a straight shape in the front-rear direction, the rod having a front end portion engageable and disengageable with and from the fixed-side front engagement portion, and a rear end portion rotatably engaged with the synchronization member, and the movable-side front engagement portion moves rearward by contact with the right operation portion or the left operation portion when the opening operation is performed on the right operation portion or the left operation portion,
the movable-side rear engagement portion is a rod extending in a straight shape in the front-rear direction, the rod having a front end portion rotatably engaged with the synchronization member, and a rear end portion engageable and disengageable with and from the fixed-side rear engagement portion, and the movable-side rear engagement portion moves frontward in synchronization with rearward movement of the movable-side front engagement portion through rotation of the synchronization member, and
the movable-side rear engagement portion is supported by being inserted movably in the front-rear direction into a through hole of a retention portion integrally provided to the lid.

* * * * *